United States Patent
Takahashi

(10) Patent No.: US 7,099,370 B2
(45) Date of Patent: Aug. 29, 2006

(54) WIRELESS COMMUNICATION SYSTEM AND METHOD OF CONTROLLING SAME

(75) Inventor: Takumi Takahashi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 10/947,169

(22) Filed: Sep. 23, 2004

(65) Prior Publication Data

US 2005/0041632 A1 Feb. 24, 2005

Related U.S. Application Data

(62) Division of application No. 09/785,174, filed on Feb. 20, 2001, now Pat. No. 6,804,289, which is a division of application No. 08/651,035, filed on May 17, 1996, now Pat. No. 6,263,210.

(30) Foreign Application Priority Data

May 18, 1995 (JP) .................................. 7-119847

(51) Int. Cl.
*H04B 1/707* (2006.01)

(52) U.S. Cl. ..................................... 375/132; 379/242

(58) Field of Classification Search .................... None
See application file for complete search history.

(56) References Cited

U.S. PATENT DOCUMENTS

| | | | |
|---|---|---|---|
| 5,142,534 A | 8/1992 | Simpson et al. |
| 5,203,011 A | 4/1993 | Bane et al. |
| 5,247,567 A | 9/1993 | Hirano |
| 5,323,447 A | 6/1994 | Gillis et al. |
| 5,423,055 A | 6/1995 | Diaz et al. |
| 5,463,659 A | 10/1995 | Nealon et al. |
| 5,465,386 A | 11/1995 | Barnes et al. |
| 5,515,366 A | 5/1996 | Chieu et al. |
| 5,537,434 A | 7/1996 | Persson et al. |
| 5,561,852 A | 10/1996 | Heeschen et al. |
| 5,570,352 A | 10/1996 | Poyhonen |
| 5,574,979 A | 11/1996 | West |
| 5,590,410 A | 12/1996 | Deutsch et al. |
| 5,617,412 A | 4/1997 | Delprat et al. |
| 5,619,553 A | 4/1997 | Young et al. |
| 5,666,661 A | 9/1997 | Grube et al. |
| 5,737,325 A | 4/1998 | Fukuda |
| 5,758,290 A | 5/1998 | Nealon et al. |
| 5,809,417 A | 9/1998 | Nealon et al. |

FOREIGN PATENT DOCUMENTS

| | | |
|---|---|---|
| EP | 0650304 A2 | 4/1995 |
| EP | 0726690 A2 | 8/1996 |
| GB | 2292868 A | 3/1996 |
| GB | 2295944 A | 6/1996 |
| JP | A5-153039 | 6/1993 |
| JP | A7-284150 | 10/1995 |
| JP | A7-307974 | 11/1995 |
| WO | WO 95/01679 | 1/1995 |
| WO | WO 95/06395 | 3/1995 |

OTHER PUBLICATIONS

R. Kohno, R. Meidan, L. B. Milstein; Spread Spectrum Access Methods for Wireless Communications; 2460 IEEE Communications Magazine; 33 Jan. 1995, No. 1, New York, US (pp. 58-67).

*Primary Examiner*—Kevin Kim
(74) *Attorney, Agent, or Firm*—Morgan & Finnegan, LLP

(57) ABSTRACT

A wireless communication system has a plurality of wireless communication devices capable of communicating with one another directly without the intervention of another device, and a wireless control unit which accommodates these wireless communication devices. The wireless control unit manages the direct communication among the wireless communication devices as well as communication between the wireless control unit and the wireless communication devices.

9 Claims, 31 Drawing Sheets

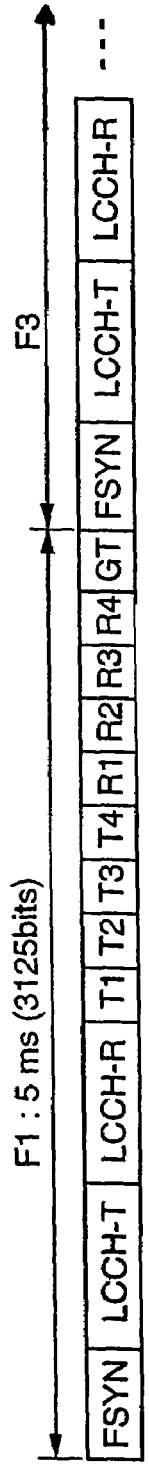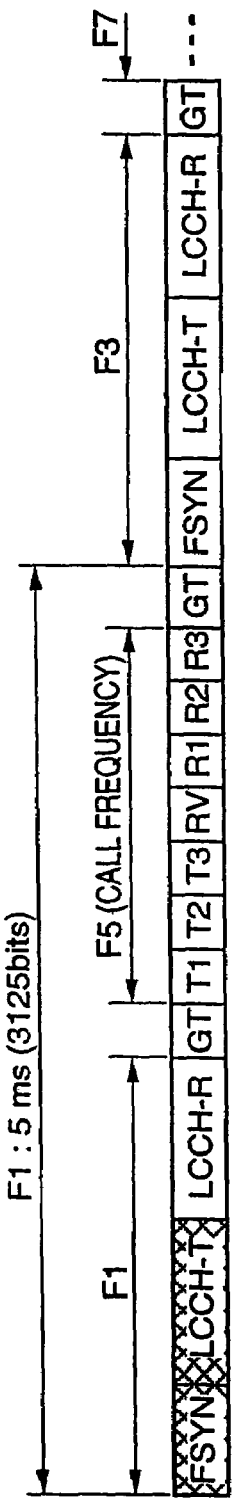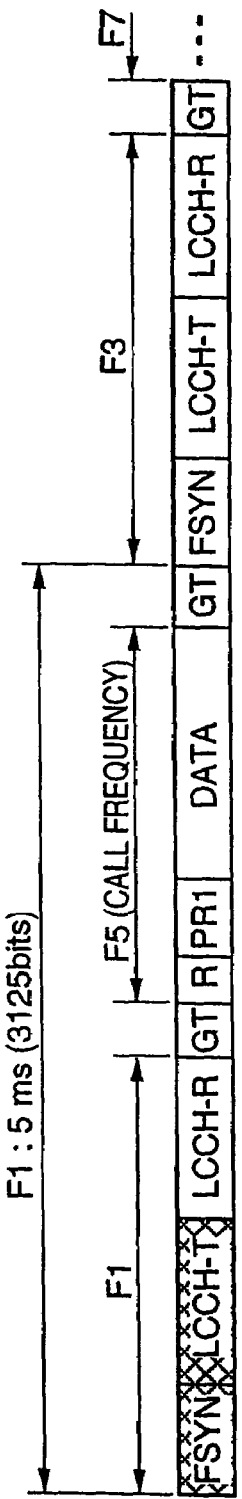

FIG. 11

| PR0 | SYN | ID | FI | TS | NFR |
|---|---|---|---|---|---|
| 62 | 31 | 63 | 2 | 8 | 8 |

FIG. 12

| R | PR1 | UW | D | B | GT |
|---|---|---|---|---|---|
| 6 | 62 | 8 | 16 | 160 | 20 |

FIG. 13

| UW | LCCH | GT |
|---|---|---|
| 8 | 160 | 20 |

FIG. 14

| R | PR1 | UW | LCCH | GT |
|---|---|---|---|---|
| 6 | 62 | 8 | 160 | 20 |

FIG. 32

| FSYN | $C_1$ | $T_1$ | $C_2$ | $T_2$ | --- | $C_n$ | $T_n$ | GT |

FIG. 33

| FSYN | GT | $C_1$ | $T_1$ | GT | $C_2$ | $T_2$ | --- | GT | $C_n$ | $T_n$ | GT |

…

WIRELESS COMMUNICATION SYSTEM AND METHOD OF CONTROLLING SAME

This is divisional of application Ser. No. 09/785,174, filed Feb. 20, 2001 now U.S. Pat. No. 6,804,289, which is a divisional of Ser. No. 08/651,035, filed May 17, 1996 now U.S. Pat. No. 6,263,210.

BACKGROUND OF THE INVENTION

1. Field of the Invention

This invention relates to a wireless communication system in which switching is performed among terminals or between terminals and a public line in wireless fashion, as well as to a method of controlling this system.

2. Description of the Related Art

Wireless communication is rapidly becoming more widespread and is finding use in a variety of fields. Telephone exchanges are no exception, and systems have been proposed in which communication between a main unit having a switching function and wireless telephones dedicated to the system (hereinafter referred to as wireless telephones) is performed in wireless fashion.

A wireless telephone exchange according to the prior art will now be described.

<System Architecture>

In a conventional wireless communication system, wireless transmission for low-power analog cordless telephones is employed for wireless communication between extension terminals and the main unit. Specifically, the modulation adopted is frequency modulation, two control channels and 87 voice channels can be used and the communication that is possible is 1:1 (point-to-point). In order that a wireless extension terminal may communicate with the main unit, a connecting device for the wireless extension terminal is required.

At the start of communication, first the voice channel to be used is decided by the control channel, a transition is then made to the voice channel and communication is continued using this channel.

Each component of the conventional wireless communication system and the basic operation thereof will now be described.

<Construction of Main Unit>

FIG. 34 is a block diagram showing the architecture of a conventional wireless communication system and the construction of a main unit thereof. A main unit J1, which is the principal component of an exchange system, accommodates a plurality of outside lines and a plurality of terminals and is adapted to switch calls among these. In order that a wireless terminal (referred to as a wireless telephone below) J3 to which a connecting device J2 is connected in point-to-point fashion can be accommodated in the system, the connecting device J2 is placed under the control of the main unit J1 and wirelessly controls the wireless terminal to establish a wireless transmission link. The wireless telephone J3 is a terminal for communicating, via the connecting device J2, with an outside line accommodated in the main unit J1 and with extensions.

The main unit J1 accommodates a PSTN (an existing public telephone network) J4, which is one outside line network, a PSTN line J5, which is an outside line from the PSTN J4, and an SLT (single line telephone) J6, which is one terminal connected to the main unit J1.

The internal construction of the main unit J1 will now be described.

As shown in FIG. 34, a CPU (J101) lies at the heart of the main unit J1 and supervises overall control of the main unit, inclusive of control of switching. The control program of the CPU (J101) is stored in the ROM J102. A RAM (J103) stores various data for control of the CPU (J101) and provides a work area for various computations.

A communication channel unit J104 switches calls (by time division switching) under the control of the CPU (J101). A PSTN line i/f (J105) performs PSTN line control, such as incoming call detection, selection-signal transmission and DC loop closure, under the control of the CPU (J101), in order to accommodate the PSTN line J5. An SLT i/f (J106) performs current feed, loop detection, selection-signal reception and call-signal transmission under the control of the CPU (J101) in order to accommodate the SLT (J6).

A telephone unit J107 has a handset, dialing keys, a speech circuit and a display, etc., for functioning as an extension multi-function telephone under the control of the CPU (J101) when the supply of power to the main unit is normal, and for functioning as an SLT in the event of a power failure. A tone transmission circuit J108 transmits various tones, such as a PB signal, dial tone and incoming call tone. A connecting device i/f (J109) sends and receives a voice signal and control signal to and from the connecting device J1 under the control of the CPU (J101) in order to accommodate the connecting device J2.

<Construction of Connecting Device>

FIG. 35 is a block diagram showing the construction of the connecting device J2 in the conventional wireless communication system. As shown in FIG. 35, the connecting device J2 has a CPU (J201) for controlling the overall connecting device, inclusive of control of the communication channel and wireless portions. A ROM (J202) stores the control program of the CPU (J201), and an EEPROM (J203) stores the call code (system ID) of the system. Furthermore, a RAM (J204) stores various data for control of the CPU (J201) and provides a work area for various computations.

A main unit i/f (J205) sends and receives a voice signal and control signal to and from the main unit J1 under the control of the CPU (J201). A PCM codec J206, which is under the control of the CPU (J201), converts a PCM-coded speech signal from the main unit i/f (J205) to an analog voice signal, transmits the analog voice signal to a voice processing LSI (J207), converts an analog voice signal from the voice processing LSI (J207) to a PCM code and transmits the PCM code to the main unit i/f (J205).

Under the control of the CPU (J201), the voice processing LSI (J207) receives a demodulated signal from a wireless unit J208, described below. If the received signal is control data, the voice processing LSI performs an A/D conversion and sends the converted data to the CPU (J201). If the received signal is a voice signal, the voice processing LSI executes processing such as descrambling and decompression and outputs the processed data to the PCM codec (J206). At the same time, the voice processing LSI subjects control data transmitted from the CPU (J201) to a D/A conversion, transmits the analog data to the wireless unit J208, subjects a voice signal from the PCM codec (J206) to scrambling such as scrambling and compression and transmits the processed signal to the wireless unit J208.

Under the control of the CPU (J201), the wireless unit J208 executes processing in such a manner that the control data and voice signal from the voice processing LSI (J207) can be modulated and wirelessly transmitted, transmits the processed signals to the wireless telephone J3, demodulates a signal received from the wireless telephone J3, extracts control data and a voice signal and transmits the results to the voice processing LSI (J207).

<Construction of Wireless Telephone>

FIG. 36 is a block diagram showing the construction of the wireless telephone J3 accommodated in the conventional wireless communication system. As shown in FIG. 36, the wireless telephone J3 has a CPU (J301) for controlling the wireless telephone J3, inclusive of wireless control and call control. A ROM (J302) stores the control program of the CPU (J301), and an EEPROM (J303) stores the call code (system ID) of the system and a sub-ID of the wireless telephone J3. A RAM (J304) stores various data for control of the CPU (J301) and provides a work area for various computations.

A communication channel unit J305 inputs and outputs speech signals to and from a handset J308, microphone J309 and speaker J310 under the control of the CPU (J301). Under the control of the CPU (J301), a voice processing LSI (J306) receives a demodulated signal from a wireless unit J307. If the received signal is control data, the voice processing LSI performs an A/D conversion and sends the converted data to the CPU (J301). If the received signal is a voice signal, the voice processing LSI executes processing such as descrambling and decompression and outputs the processed data to the communication channel unit J305. The voice processing LSI subjects control data transmitted from the CPU (J301) to a D/A conversion, transmits the analog data to the wireless unit J307, subjects a voice signal from the communication channel unit J305 to processing such as scrambling and compression and transmits the processed signal to the wireless unit J307.

Under the control of the CPU (J301), the wireless unit J307 executes processing in such a manner that the control data and voice signal from the voice processing LSI (J306) can be modulated and wirelessly transmitted, and transmits the processed signals to the wireless connection unit J2. At the same time, the wireless unit J307 demodulates a signal wirelessly received from the wireless connection unit J2, extracts control data and a voice signal and transmits the results to the voice processing LSI (J306).

The handset J308 inputs and outputs voice signals in order that a system user may communicate, the microphone J309 collects and enters voice signals and the speaker J310 emanates a voice signal. A dialed number entered from a key matrix J311, the status of outside lines, etc., are displayed on a display unit J312. The key matrix J311 comprises dialing keys (not shown) for entering telephone numbers, outside line keys, a hold key and function keys such as a speaker key.

<Operation of Conventional Wireless Communication System>

The basic operation of the conventional wireless communication system will now be described.

FIG. 37 illustrates the operating sequence of the conventional wireless communication system. When a request for originating a call is made at the wireless telephone J3, the latter sends the connecting device J2 a connection notification signal on a predetermined wireless control channel (sequence J401). Upon receiving the connection notification signal, the connecting device J2 checks the status of the wireless speech channels and, if a usable speech channel exists, sends a connection answer signal to the wireless telephone J3 (sequence J402).

Upon receiving the connection answer signal, the wireless telephone J3 changes over the frequency used from the wireless control channel to the wireless speech channel and transmits a channel-shift notification signal to the connecting device J2 (J403). Signals are sent and received on the speech channel from this point onward.

Upon receiving the shift notification signal, the connecting device J2 acknowledges the transition to the speech channel and transmits a channel-shift answer signal to the wireless telephone J3 (J404). The connecting device J2 then sends the main unit J1 notification of line connection (J405), after which a transition is made to the speech communication state.

If the wireless telephone J3 receives the channel-shift answer signal in sequence J404 and confirms establishment of a wireless link, the wireless telephone J3 sends the connecting device J2 an outside-line outgoing call signal (J406. Upon receiving the outside-line outgoing call signal, the connecting device J2 originates an outside-line call in the main unit 1 (J407). When there is a voice connection request from the main unit J1 to the connecting device J2 (J408) and from the connecting device J2 to the wireless telephone J3 (J409), a dial tone is transmitted (J410). Accordingly, it is possible to dial for making an outgoing call (J411). From this point onward, the outgoing call to the outside line is implemented. When the called party answers, a transition is made to speech communication (J412).

Through the procedure described above, a wireless telephone is capable of placing a telephone call via a public switched telephone line. With regard to an incoming call as well, a wireless speech channel is acquired and a telephone call can be initiated and continued through a procedure similar to that described above.

Similarly, when an extension call is placed, the call between extensions is implemented via the main unit.

There is also a system in which wireless telephones can perform direct extension communication with each other without the intermediary of the main unit. In the case of such a system, a wireless telephone on the originating side itself acquires an idle wireless link and notifies a wireless telephone on the called side. The notified wireless telephone performs extension communication by effecting a transition to the wireless link of which it has been notified.

In this conventional wireless exchange system, however, narrow-band frequency modulation is used as the method of wireless modulation. As a result, the transmission rate is limited and, hence, the audio from a plurality of wireless telephones cannot be multiplexed using a single carrier frequency. Accordingly, the connecting device and the wireless telephone must be used in a one-to-one (point-to-point) relationship. If the number of wireless telephones accommodated increases, the number of connecting devices must be increased. There is also a limit upon the number of connecting devices that can be accommodated by the main unit and upon the number of wireless telephones that can be accommodated.

In the case where extensions communicate via the main unit, the main unit is used as a relay and is subjected to a load. In the case where wireless telephones place extension calls to each other directly, the wireless telephones acquire the wireless channel. This means that the main unit cannot determine whether this wireless channel is currently being used or is incapable of being used because of disturbing waves.

Further, in the case where wireless telephones place extension calls to each other directly, the status of use of the wireless telephones and the status of use of the wireless channels cannot be managed by the main unit. Furthermore, since a wireless telephone J3 communicates using the wireless channel which it itself acquired, control information cannot be received from the main unit.

SUMMARY OF THE INVENTION

An object of the present invention is to provide a wireless communication system in which selection of communication means conforming to a communication request and status of communication is possible.

Another object of the present invention is to reduce the load upon the main unit in communication between extensions.

A further object of the present invention is to make it possible for the main unit to implement centralized administration of wireless terminals and wireless channels used in a wireless communication system.

Yet another object of the present invention is to provide a wireless communication system in which control information can be sent and received between the main unit and wireless terminals even when the wireless terminals communication with each other directly.

A further object of the present invention is to provide a wireless communication system that is easy to operate.

A further object of the present invention is to provide a wireless communication system that is highly flexible.

A further object of the present invention is to provide a wireless communication system featuring excellent communication security and resistance to noise.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing the architecture of a PCF frame;

FIG. 9 is a diagram showing the architecture of a PPF frame;

FIG. 10 is a diagram showing the architecture of a BDF frame;

FIG. 11 is a diagram showing the architecture of an FSYN frame;

FIG. 12 is a diagram showing the architecture of a voice-channel frame;

FIG. 13 is a diagram showing the architecture of an LCCH-T frame;

FIG. 14 is a diagram showing the architecture of an LCCH-R frame;

FIG. 32 is a diagram showing an example of a frame transmitted by the main unit;

FIG. 33 is a diagram showing an example of a frame transmitted by a slave;

DESCRIPTION OF THE PREFERRED EMBODIMENTS

Preferred embodiments of the present invention will now be described with reference to the accompanying drawings.

[First Embodiment]

One type of digital wireless communication that has become the focus of attention in recent years is spread-spectrum communication. In spread-spectrum communication, the information transmitted is spread over a wide bandwidth. This provides the advantages of improved interference avoidance and security. At the present time, frequencies in the 2.4 GHz band have been allocated for spread-spectrum communication in various countries and the use of spread-spectrum communication is growing world-wide.

Spread-spectrum communication is broadly divided into frequency hopping (FH) and direct sequence (DS). In FH, transmission using a wide band is performed by changing the modulating frequency within a fixed period of time. In DS, a wide band is used by spreading and modulating the information for transmission using a pseudo-noise code having a rate which is ten times to several hundred times the rate of the information.

In this embodiment, a case will be described in which digital wireless communication based upon the above-mentioned frequency-hopping scheme is used in transmission between extensions in a wireless communication system.

<System Architecture>

Figure 1:
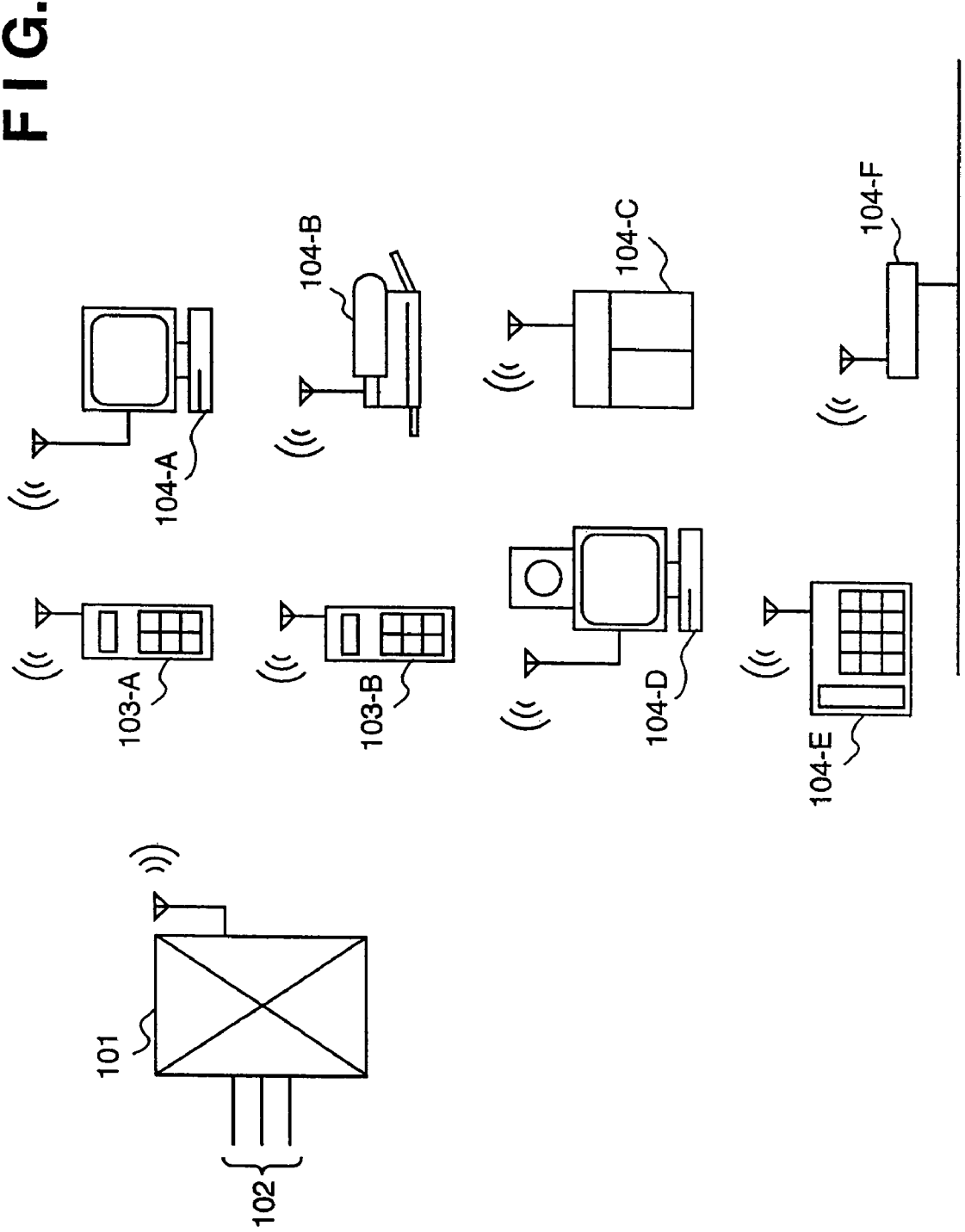
FIG. 1 is a diagram showing the overall arrangement of a wireless communication system according to an embodiment of the present invention.

FIG. 1 is a diagram showing the overall arrangement of a wireless communication system (hereinafter referred to as the "system") according to an embodiment of the present invention. The system shown in FIG. 1 includes an exchange 101 accommodating public switched telephone lines 102 and having a switching function and a wireless connecting function, a plurality of wireless telephones 103-A, 103-B for communication of control data and voice data with the exchange 101, and data terminal equipment 104-A~104-F for communication of control data with the exchange 101 and direct communication of data with terminals.

An item of data terminal equipment in this embodiment is defined as a device which is a combination of a terminal (data terminal) having a function for transmitting bursts of data in any amount and a wireless adapter for administering wireless communication between the data terminal and a main unit. Examples of data terminals are a computer 104-A, a printer 104-B, a copier 104-C, a TV conferencing terminal 104-D, a facsimile machine 104-E and a LAN bridge 104-F. Other examples (not shown) are electronic cameras, video cameras, scanners and various other terminals that execute data processing.

The wireless telephones and data terminals mentioned above are capable of communicating freely with one another and, at the same time, are capable of accessing a public switched telephone network. This is a major feature of this system. The details of construction and operation thereof will now be described.

<Construction of Main Unit>

Described first will be the construction of the main unit of the system according to this embodiment, which accommodates a public switched telephone line.

Figure 2:
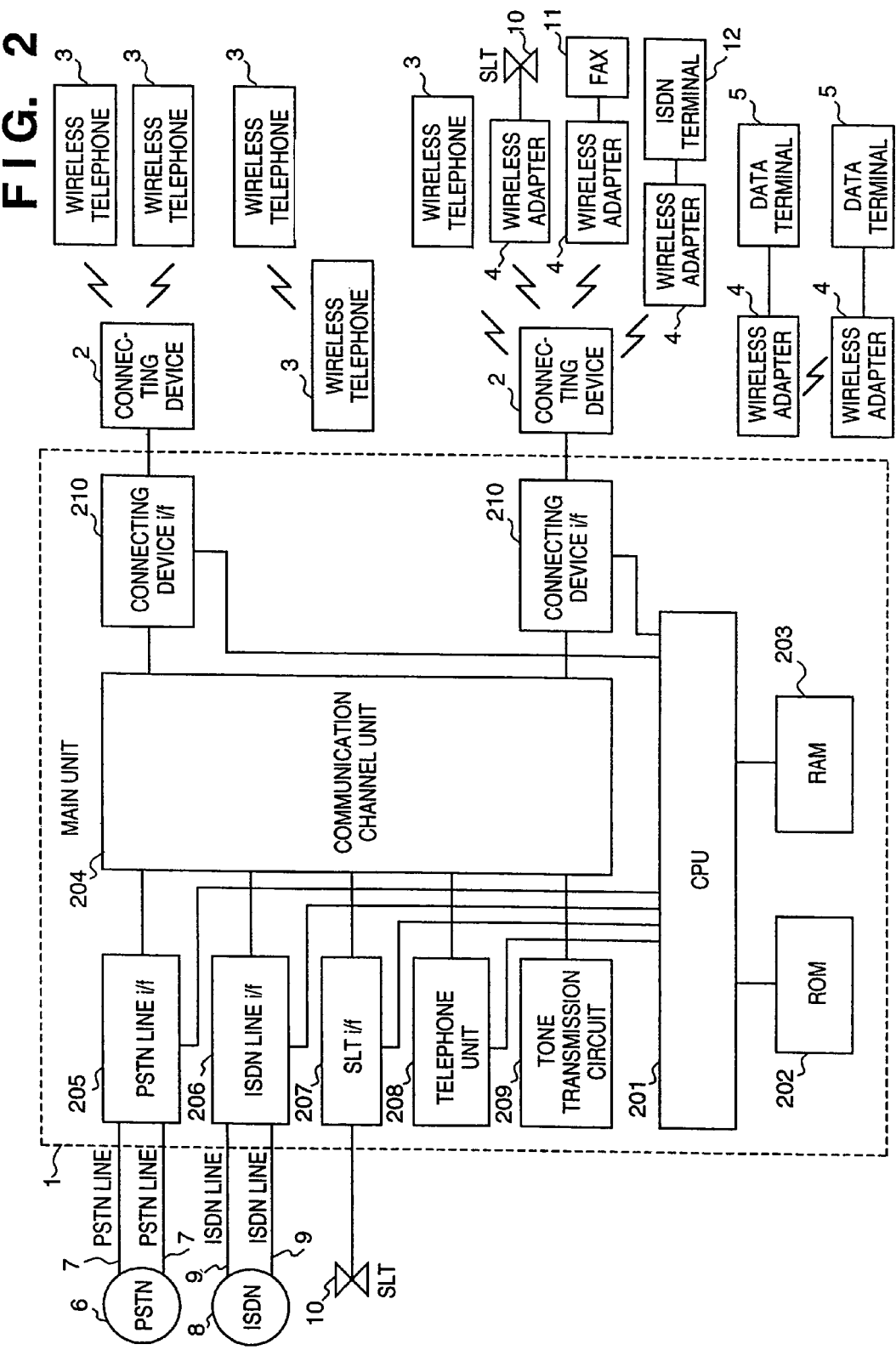
FIG. 2 is a block diagram showing the system configuration and the construction of a main unit according to the embodiment of the invention.

FIG. 2 is a block diagram showing the system configuration and the construction of a main unit according to the embodiment of the invention. A main unit 1, which is the principal component of this system, accommodates a plurality of outside lines and a plurality of terminals and is adapted to switch calls among these. In order that a wireless terminal (a wireless telephone below or a data terminal to which a wireless adapter has been connected) can be accommodated in the system, a connecting device 2 is placed under the control of the main unit 1 and wirelessly controls the wireless terminal to establish a wireless transmission link.

The wireless telephone 3 is a telephone for communicating, via the connecting device 2, with an outside line accommodated in the main unit 1, and for talking with other extensions. A wireless adapter 4 is an adapter which, by being connected to a data terminal 5 such as a personal computer or printer, an SLT (single line telephone) 10, a facsimile machine (FAX) 11 and an ISDN (Integrated Services Digital Network) terminal 12, makes it possible to transfer data wirelessly between similarly configured data terminals.

The main unit 1 accommodates a PSTN (an existing public switched telephone network) 6, which is one outside line network, PSTN lines 7, which are outside lines from the PSTN 6, an ISDN 8, which is also one outside line network, and ISDN lines 9, which are lines from the ISDN 8. Numeral 10 denotes an SLT (single line telephone), which is one terminal connected to the main unit 1.

The internal construction of the main unit 1 will now be described.

A CPU 201 lies at the heart of the main unit 1 and supervises overall control of the main unit, inclusive of control of switching. The control program of the CPU 201 is stored in a ROM 202. A RAM 203 stores various data for control of the CPU 201 and provides a work area for various computations. A communication channel unit 204 supervises the switching (by time division switching) of calls under the control of the CPU 201. A PSTN line i/f 205 performs PSTN line control, such as incoming call detection, selection signal transmission and DC loop closure, under the control of the CPU 201, in order to accommodate the PSTN lines 7. Under the control of the CPU 201, an ISDN i/f 206 supports layer 1 and layer 2 of the ISDN for accommodating the ISDN lines and controls the ISDN lines. An SLT i/f 207 performs current feed, loop detection, selection signal reception and call-signal transmission under the control of the CPU 201 in order to accommodate the SLT 10.

A telephone unit 208 has a handset, dialing keys, a talking circuit and a display, etc., for functioning as an extension wireless telephone under the control of the CPU 201 when power is supplied to the main unit, and for functioning as an SLT in the event of a power failure. A tone transmission circuit 209 transmits various tones, such as a PB signal, dial tone and incoming call tone. A connecting device i/f 210 sends and receives a voice signal and control signal to and from the connecting device 2 under the control of the CPU 201 in order to accommodate the connecting device 2.

<Construction of Connecting Device>

Figure 3:
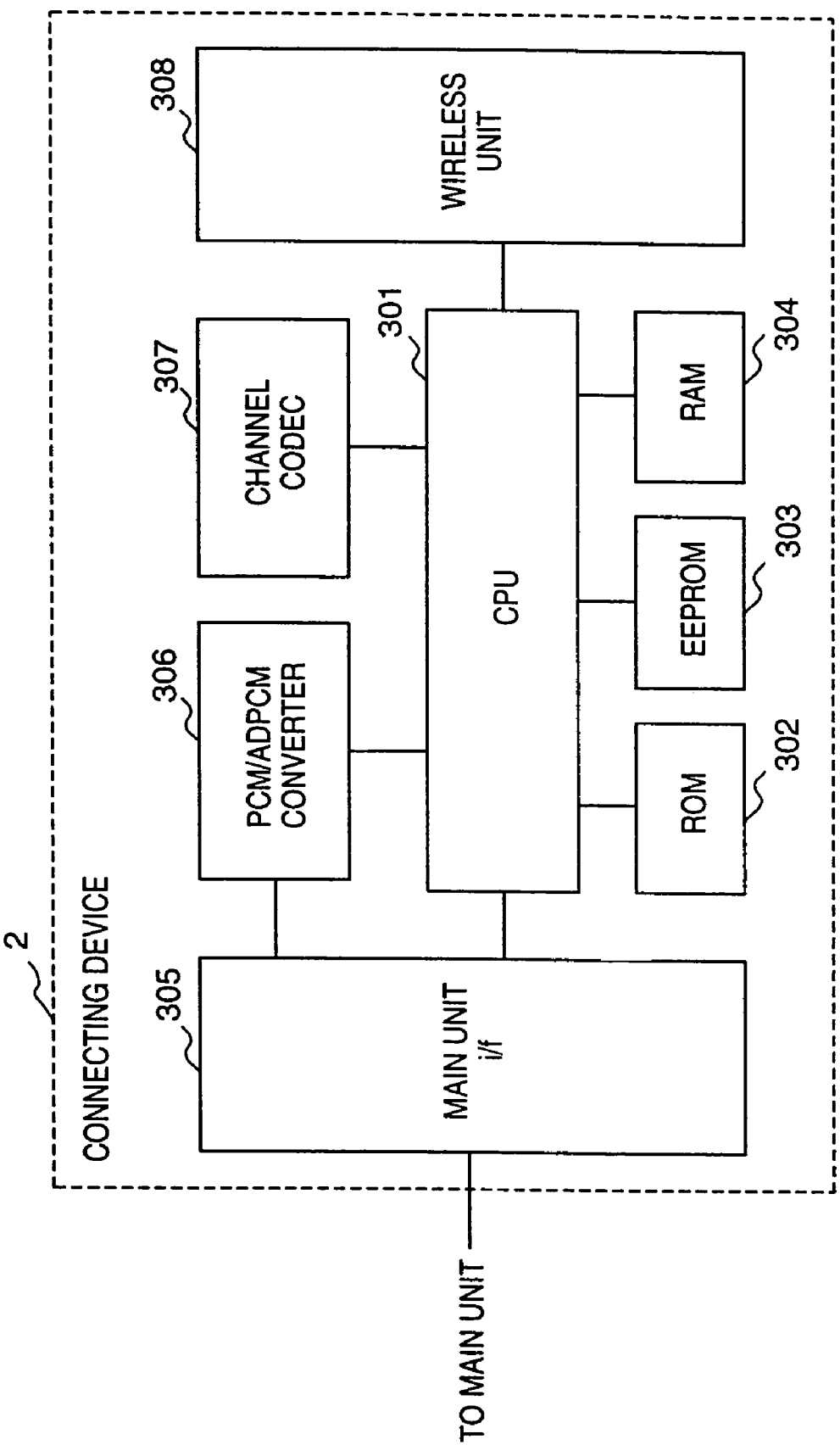
FIG. 3 is a block diagram showing the internal construction of a connecting device.

FIG. 3 is a block diagram showing the internal construction of the connecting device 2 according to this embodiment. As shown in FIG. 3, the connecting device 2 has a CPU 301 for controlling the overall connecting device, inclusive of control of the communication channel and wireless portions. A ROM 302 stores the control program of the CPU 301, and an EEPROM 303 stores the call code (system ID) of the system. Furthermore, a RAM 304 stores various data for control of the CPU 301 and provides a work area for various computations.

A main unit i/f 305 sends and receives a voice signal and control signal to and from the connecting device i/f 210 of the main unit 1 under the control of the CPU 301. A PCM/ADPCM converter 306, which is under the control of the CPU 301, converts a PCM (pulse code modulation)-coded speech signal from the main unit 1 to an ADPCM (adaptive differential pulse code modulation) code, transmits this code to a channel codec 307 (described later), converts an ADPCM-coded voice signal from the channel codec 307 to a PCM code and transmits the PCM code to the main unit 1.

Under the control of the CPU 301, the channel codec 307 applies processing such as scrambling to the ADPCM-coded speech signal and control signal, and time-division multiplexes these signals in predetermined frames. Under the control of the CPU 301, the wireless unit 308 executes processing in such a manner that the digital signal in the form of frames from the channel codec 307 can be modulated and wirelessly transmitted, and subsequently transmits the processed signals to an antenna. In addition, the wireless unit 308 demodulates a signal wirelessly received from the antenna and processes the signal to a digital signal in the form of frames.

<Construction of Wireless Telephone>

Figure 4:
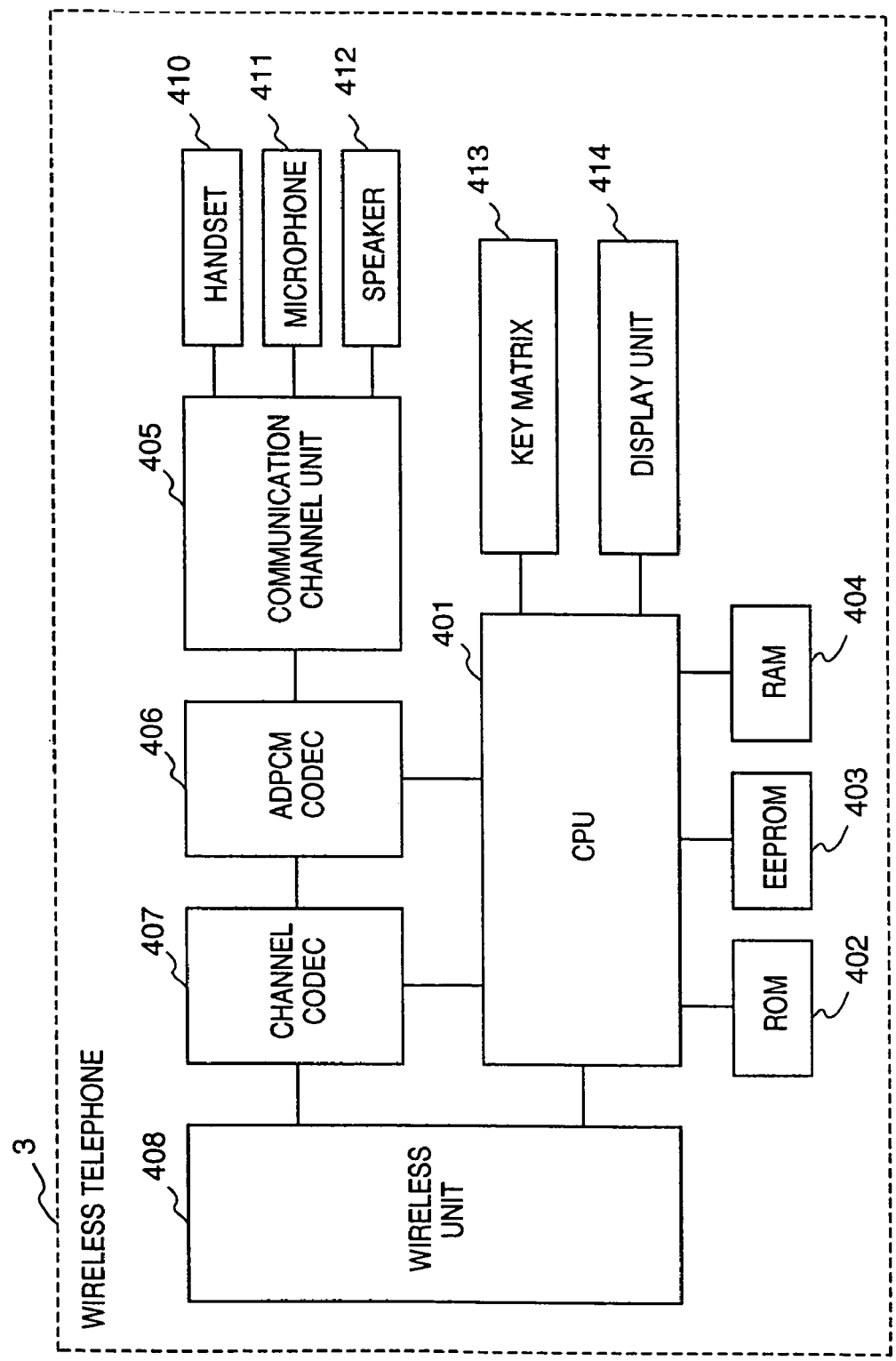
FIG. 4 is a block diagram showing the construction of a wireless telephone.

FIG. 4 is a block diagram showing the construction of the wireless telephone 3 according to this embodiment. As shown in FIG. 4, the wireless telephone 3 has a CPU 401 for controlling the overall wireless telephone 3, inclusive of wireless control and call control. A ROM 402 stores the control program of the CPU 401, and an EEPROM 403 stores the call code (system ID) of the system and a sub-ID of the wireless telephone 3. A RAM 404 stores various data for control of the CPU 401 and provides a work area for various computations.

A communication channel unit 405 inputs and outputs speech signals to and from a handset 410, microphone 411 and speaker 412 under the control of the CPU 401. Under the control of the CPU 401, an ADPCM codec 406 converts an analog voice signal from the communication channel unit 405 to an ADPCM code and transmits the code to a channel codec 407, described later. In addition, the ADPCM codec 406 converts an ADPCM-coded speech signal from the channel codec 407 to an analog voice signal and transmits the voice signal to the communication channel unit 405.

Under the control of the CPU 401, the channel codec 407 applies processing such as scrambling to the ADPCM-coded speech signal and control signal, and time-division multiplexes these signals in predetermined frames. Under the control of the CPU 401, a wireless unit 408 executes processing in such a manner that the digital signal in the form of frames from the channel codec 407 can be modulated and wirelessly transmitted, and transmits the processed signals to an antenna. In addition, the wireless unit 408 demodulates a signal wirelessly received from the antenna and processes the signal to a digital signal in the form of frames.

The handset 410 inputs and outputs voice signals in order that a system user may communicate, and the microphone 411 collects and enters voice signals. The speaker 412 emanates a voice signal. A dialed number entered from a key matrix 413, the status of outside lines, etc., are displayed on a display unit 414. The key matrix 413 comprises dialing keys (not shown) for entering telephone numbers, outside line keys, a hold key and function keys such as a speaker key.

<Construction of Wireless Adapter>

Figure 5:
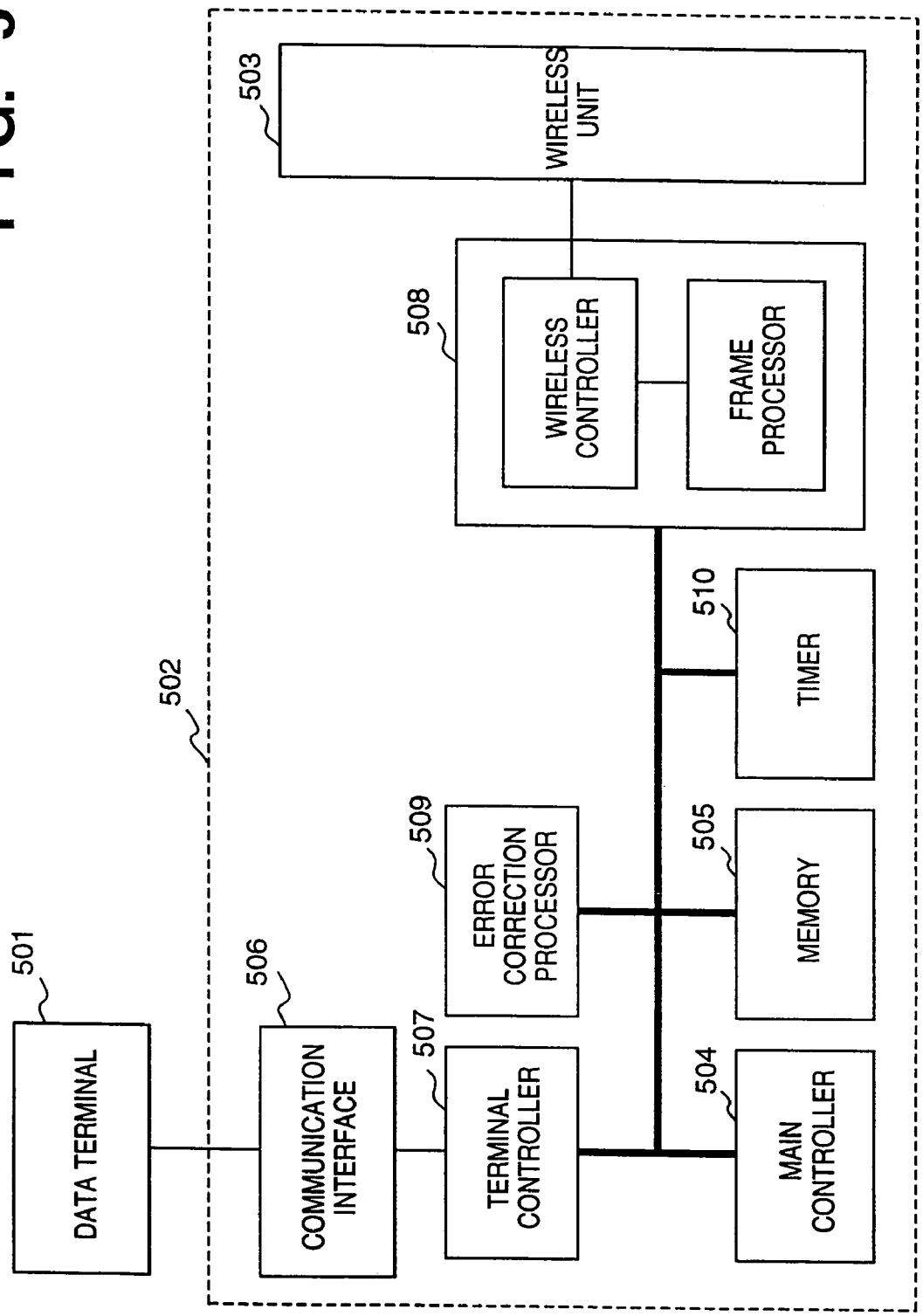
FIG. 5 is a block diagram showing the internal construction of a wireless adapter.

FIG. 5 is a block diagram showing the internal construction of a wireless adapter 502 connected to a data terminal capable of being accommodated by the present system. In FIG. 5, a data terminal 501 is a terminal such as a personal computer, work station, printer or facsimile machine connected to the wireless adapter 502 via a communication cable or internal bus.

The wireless adapter 502 includes a main controller 504 comprising a CPU, peripheral devices for interrupt control and DMA control, etc., and an oscillator for a system clock, etc., these units not being illustrated. The main controller 504 controls each of the blocks in the wireless adapter. A memory 505 is constituted by, e.g., a ROM for storing the programs used by the main controller 504, and a RAM used as a buffer area for various processing.

A communication i/f unit 506 is a communication interface with which various data terminals, such as the above-mentioned data terminal 501, are provided as standard equipment. Examples are the RS-232C, the Centronics interface and the communication i/f of a LAN, the internal bus of a personal computer or work station, such as an ISA bus, or a PCMCIA (Personal Computer Memory Card International Association) i/f. A terminal controller 507 supervises communication control of various types which is necessary when data communication is performed between the data terminal 501 and wireless adapter 502 via the communication i/f 506. A channel codec 508, the internal construction of which will be described later, performs frame processing and wireless control. Data that have been assembled into frames by the channel codec 508 are transmitted to the main unit or counterpart terminal via the wireless unit 503.

An error correction processor 509 is used to reduce bit error produced in data by wireless communication. At the time of transmission, the processor 509 inserts an error-correcting code in the data for communication. At the time of reception, the processor 509 calculates the error position and error pattern by processing and corrects the bit error contained in the received data. A timer 510 furnishes a timing signal used in each block within the wireless adapter 502.

Figure 6:
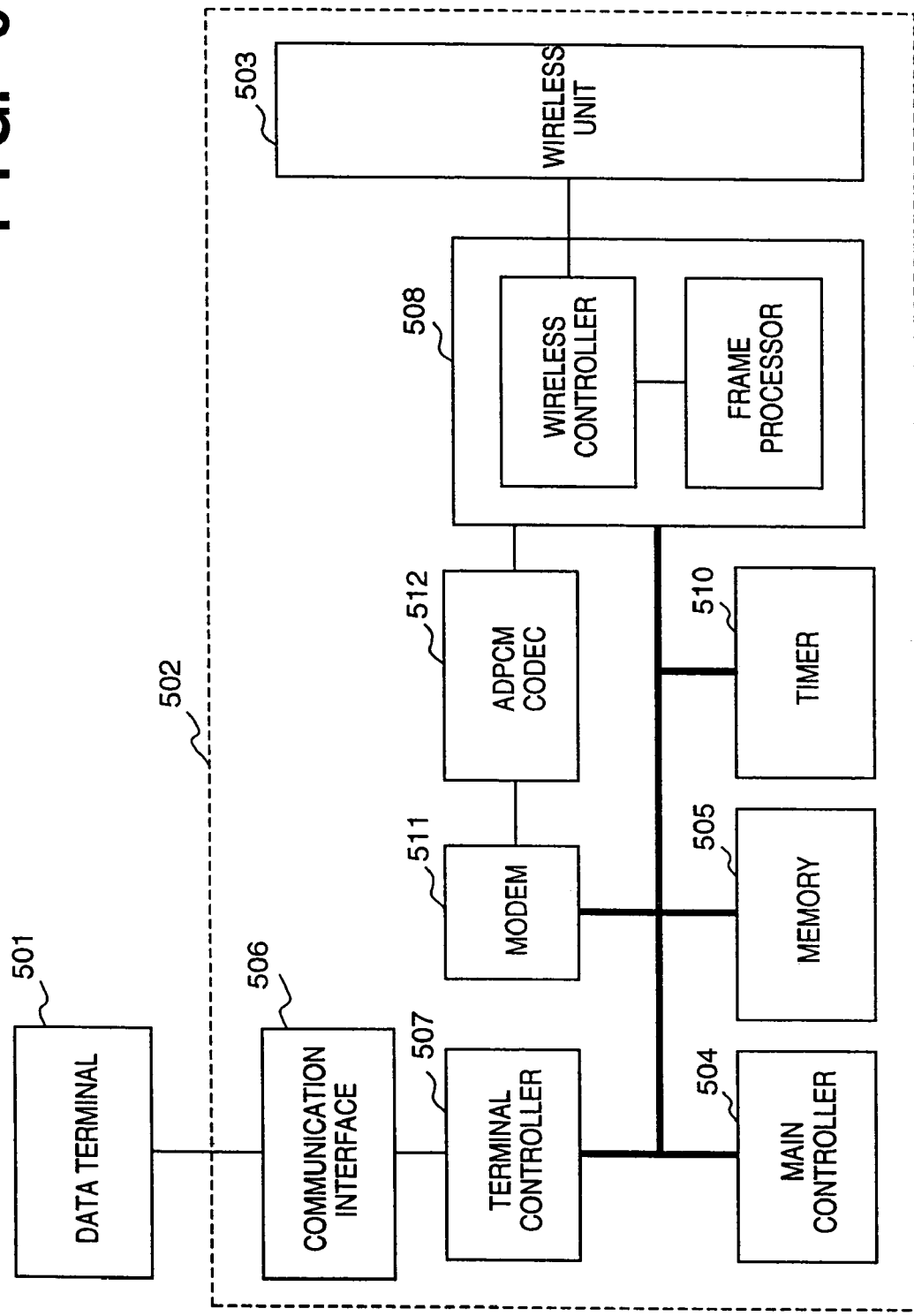
FIG. 6 is a block diagram showing the construction of a wireless adapter of the type having an internal modem.

FIG. 6 is a block diagram showing the construction of a wireless adapter of the type having an internal modem. This is a wireless adapter necessary when transmitting data to a public switched telephone line. Components identical with those in the wireless adapter of FIG. 5 are designated by like reference characters and need not be described again.

As shown in FIG. 6, the wireless adapter 502 includes a modem 511 for modulating data to a voice band signal, and an ADPCM codec 512 for encoding the signal modulated by the modem 511. The ADPCM-coded data are assembled into frames by a channel codec (described below) and then transmitted to the main unit 1 via the wireless unit 503.

<Construction of Wireless Unit>

Figure 7:
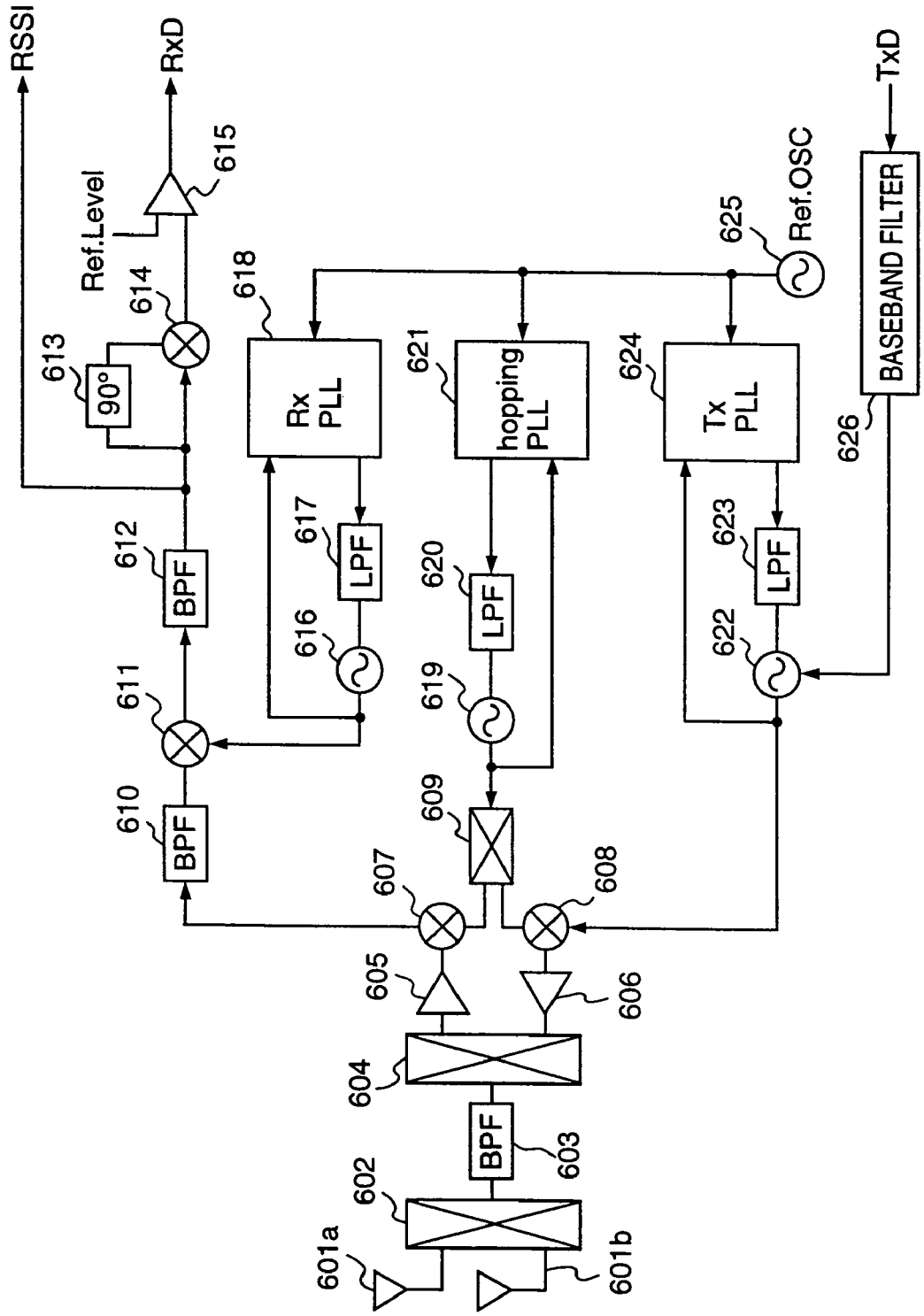
FIG. 7 is a block diagram showing the construction of a wireless unit of which shared use is made.

FIG. 7 is a block diagram showing the construction of the wireless unit, which is common to the main unit, wireless telephones and data terminals of the system. As shown in FIG. 7, the wireless unit includes transceiver antennae 601a, 601b, a switch 602 for switching between the antennae 601a, 601b, a bandpass filter (hereinafter referred to as a "BPF") 603 for removing signals in unnecessary bands, a transceiver changeover switch 604, a receiving amplifier 605, a transmitting amplifier (equipped with power control) 606, a first IF down-converter 607, an up-converter 608, a transceiver changeover switch 609, a BPF 610 for removing unnecessary band signals from the down-converted signal obtained from the down-converter 607, and a second IF down-converter 611. The down-converters 607, 611 implement double-conversion reception.

The wireless unit further includes a second IF BPF 612, a 90° phase shifter 613 and a quadrature detector 614. The BPF 612 and 90° phase shifter 613 detect and demodulate the received signal. Further provided are a waveshaping converter 615, a voltage-controlled oscillator (hereinafter referred to as a "VCO") 616 in the receiving loop, a low-pass filter (hereinafter referred to as an "LPF") 617, and a phase-locked loop (PLL) 618 constituted by a programmable counter, prescaler and phase comparator, etc. The VCO 616, LPF 617 and PLL 618 construct a frequency synthesizer in the receiving loop.

The wireless unit further includes a VCO 619 for generating a carrier signal, an LPF 620 and a PLL 621 constituted by a programmable counter, prescaler and phase comparator, etc. The VCO 619, LPF 620 and PLL 621 construct a frequency synthesizer for frequency hopping. The wireless unit further includes a transmitting VCO 622 having a modulating function, an LPF 623, and a PLL 624 constituted by a programmable counter, prescaler and phase comparator, etc. The VCO 622, LPF 623 and PLL 624 construct a frequency synthesizer in the transmitting loop. The synthesizer has a frequency modulating function.

A clock 625 is the reference clock of each of the PLLs 618, 621 and 624, and a baseband filter 626 is a signal for limiting the band of the transmitted data (baseband signal).

<Operation of Wireless Unit>

(1) Operation at Time of Transmission

Digital data that have entered the wireless unit from an external circuit such as a processor (not shown) has its bandwidth limited by the baseband filter 626, after which the data enter the modulating terminal of the VCO 622 in the transmitting loop. Intermediate-frequency (IF) modulating waves produced by the frequency synthesizer constructed by the VCO 622, LPF 626 and PLL 624 enter the up-converter 608, which adds this signal to the carrier signal generated by the frequency synthesizer constructed by the VCO 619, LPF 620 and frequency-hopping PLL 621. The resulting signal enters the amplifier 606 in the transmitting loop.

At transmission, the signal amplified to a predetermined level by the amplifier 606 has signals in unnecessary bands which will be removed by the BPF 603, after which the signal is radiated into the air as radio waves from the antennae 601a, 601b.

(2) Operation at Time of Reception

A signal received by the antennae 601a, 601b has signals in unnecessary bands which will be removed by the BPF 603, after which the signal is amplified to a predetermined level by the amplifier 605 in the receiving loop. The received signal amplified to the predetermined level has its carrier removed by the down-converter 607 and is converted to a signal in a first intermediate frequency. The first IF reception signal has signals in unnecessary bands which will be removed by the BPF 610, after which the signal enters the second down-converter 611 for intermediate frequencies.

The down-converter 611 generates a signal having a second intermediate frequency based upon a signal produced by the frequency synthesizer, which is constructed by the VCO 616, LPF 617 and PLL 618 in the receiving loop, and the input signal from the first IF down-converter. The reception signal down-converted to the intermediate frequency has signals in unnecessary bands which will be removed by the BPF 612, after which the signal enters the 90° phase shifter 613 and quadrature detector 614.

The quadrature detector 614 uses the signal phase-shifted by the phase shifter 613 and the original signal, to perform detection and demodulation. Analog data demodulated by the quadrature detector 614 is wave-shaped as digital data by the converter 615 and then outputted to an external circuit.

<Architecture of Wireless Frame>

FIGS. 8 to 14 illustrate the frame architectures of wireless frames used in this system. Three different frames are used in this system, namely a frame (referred to as a "PCF" below) for communication between the main unit and wireless telephones, a frame (referred to as a "PPF") for communication between wireless telephones, and a burst-data frame (referred to as a "BDF" below).

The details of the data contained in these frames will now be-described.

A PCF, which is shown in FIG. 8, includes a synchronizing signal FSYN, a logical control channel LCCH-T sent from the main unit to a wireless telephone, a logical control channel LCCH-R sent from a wireless telephone to the main unit, voice channels T1, T2, T3 and T4 sent to four different wireless telephones, voice channels R1, R2, R3 and R4 sent from four different wireless telephones, and guard time GT. Further, F1 and F3 in FIG. 8 represent frequency channels used when the above-mentioned frame is wirelessly transmitted. The frequency channel is changed every frame.

A PPF, which is shown in FIG. 9, includes a synchronizing signal FSYN, a logical control channel LCCH-T sent from the main unit to a wireless telephone, a logical control channel LCCH-R sent from a wireless telephone to the main unit, voice channels T1, T2 and T3 sent to three different wireless telephones, voice channels R1, R2 and R3 sent from three different wireless telephones, and guard time GT. Further, RV represents a reserve bit.

In FIG. 9, F1, F3, F5 and F7 indicate frequency channels used when the above-mentioned frame is wirelessly transmitted. Unlike the case with the PCF, communication between wireless telephones is performed by accepting the logical control information LCCH-T from the main unit over the frequency channel F1 and then changing over the frequency channel to F5, which is provided for communication between wireless telephones. Thereafter, the frequency channel is changed over to F3, logical control information is accepted from the main unit and the frequency channel is changed over to F7, which is provided for communication between wireless telephones. This procedure is repeated until communication between wireless telephones ends.

A BDF, which is shown in FIG. 10, includes a synchronizing signal FSYN, a logical control channel LCCH-T sent from the main unit to a wireless telephone, a logical control channel LCCH-R sent from a wireless telephone to the main unit, carrier sensing time R for verifying that the preceding frame has ended and that another wireless apparatus is not emitting radio waves, a preamble PR1, a data slot DATA for accommodating burst data, and guard time GT.

In FIG. 10, F1, F3, F5 and F7 indicate frequency channels used when the above-mentioned frame is wirelessly transmitted. Unlike the case with the PCF, communication between wireless telephones is performed by accepting the logical control information LCCH-T from the main unit over the frequency channel F1 and then changing over the frequency channel to F5, which is reserved for communication between wireless telephones. Thereafter, the frequency channel is changed over to F3, logical control information is accepted from the main unit and the-frequency channel is changed over to F7, which is reserved for communication between wireless telephones. This procedure is repeated until communication between wireless telephones ends.

FIG. 11 illustrates the architecture of the synchronizing signal FSYN frame. This includes a 62-bit preamble for frequency synchronization, a 31-bit frame synchronizing signal SYN, a 63-bit call signal ID, a 2-bit channel identifying signal, namely a signal for distinguishing among the PDF, PPF and BDF, time-slot information TS and frequency information NFR indicating the frequency of the next frame. The numerals in FIG. 11 indicate the numbers of bits constituting the respective signals.

FIG. 12 shows the architecture of the voice-channel frame. Since T1, T2, T3, T4 and R1, R2, R3, R4 are common in terms of constitution, the voice channels for transmission are indicated collectively by Tn and the voice channels for reception are indicated collectively by Rn. Further, Tn and Rn are identical in composition.

In FIG. 12, the frame includes carrier sensing time R for verifying that the preceding frame has ended and that another wireless apparatus is not emitting radio waves, a preamble PR1 for each slot, a unique word UW which contains a sub-ID, 3.2-kbps D-channel information D, 32-kbps B-channel information B and guard time GT. Here also the numerals indicate the numbers of-bits.

FIG. 13 shows the frame architecture of the logical control channel LCCH-T. As mentioned above, the logical control channel LCCH-T is sent from the main unit to a wireless telephone. The frame includes a unique word UW which contains a sub-ID, logical control information LCCH and guard time GT. Since the LCCH-T is sent after FSYN, this frame has no preamble or the like.

FIG. 14 shows the frame architecture of the logical control channel LCCH-R. As mentioned above, the logical control channel LCCH-R is sent from a wireless telephone to the main unit. The frame includes carrier sensing time R for verifying that the preceding frame has ended and that another wireless apparatus is not emitting radio waves, a preamble PR1 for each slot, a unique word UW containing a sub-ID, logical control information LCCH and guard time GT.

<Channel Codec>

Figure 15:
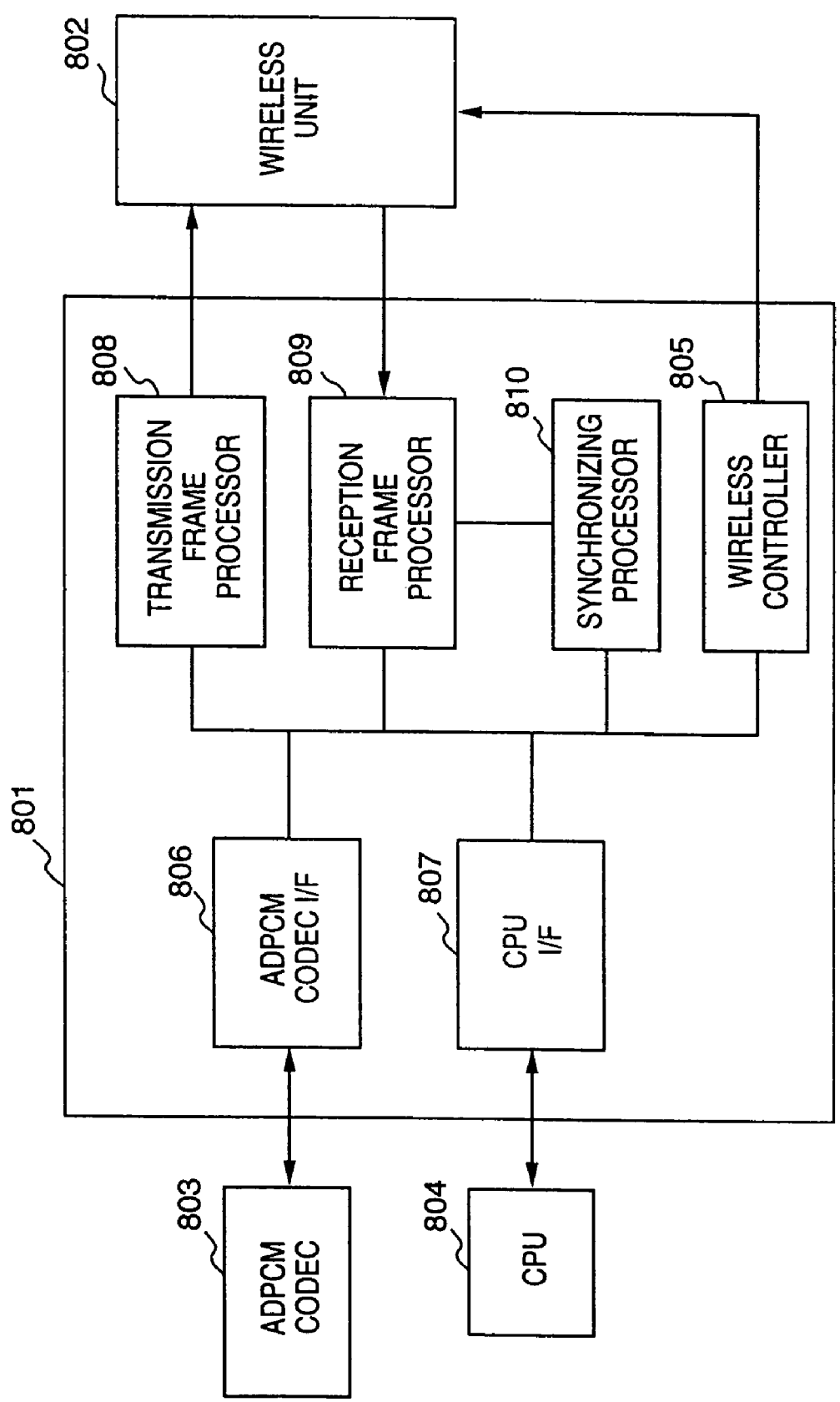
FIG. 15 is a block diagram showing the internal construction of a channel codec.

FIG. 15 is a block diagram showing the internal construction of a channel codec according to this embodiment. The frames described above are processed by this codec.

As shown in FIG. 15, the channel codec 801 is connected to a wireless unit 802, an ADPCM codec 803 incorporated in a wireless telephone or the like, and a CPU 804 of wireless telephone or wireless adapter. The channel codec 801 includes a wireless controller 805 for controlling changeover between transmission and reception with regard to the wireless unit 802, and for controlling frequency hopping. The wireless controller 805 also functions to detect the carrier prior to data transmission.

A CPU I/F 807 is an interface for exchanging control information with the CPU 804. The I/F 807, which has an internal register for storing the states of various components in the channel codec as well as operating mode, controls each component in the channel codec in conformity with the control signal from the CPU 804 and the status of each component of the channel codec. The codec includes an ADPCM codec i/f 806 which exchanges serial data and a synchronizing clock with the ADPCM codec 803 for the purpose of exchanging voice signals. A transmission frame processor 808 assembles signals from the ADPCM codec 803 and logical control data entered from the CPU 804 in the above-mentioned transmission frame.

A reception frame processor 809 extracts control information and voice data from a signal frame which is sent from the wireless unit 802 and delivers the control information and voice data to the ADPCM codec i/f 806 and CPU i/f 807. A synchronizing processor 810, which is constituted by a DPLL (delay phase-locked loop), reproduces the clock from the received signal and implements bit synchronization.

The basic operation of the above-mentioned channel codec will now be described.

(1) Operation at Time of Transmission

At transmission, control information appended to a transmission data frame is accepted from the CPU 804 by way of the CPU i/f 807. In a case where the channel codec is used by a wireless telephone and by the connecting device within the main unit, a transmission frame is assembled by the transmission frame processor 808 together with the data from the ADPCM codec 803. In a case where the channel codec is used by a data terminal, a transmission frame is assembled by the transmission frame processor 808 together with error-correction coded burst data.

The data are scrambled when the frame is assembled. This is necessary in order to maintain DC balance at the time of wireless transmission. At the moment the received signal ends, the wireless controller 805 places the wireless unit in the transmitting mode following sensing of the carrier and delivers the transmission frame to the wireless unit.

(2) Operation at Time of Reception

The wireless controller 805 changes over the wireless unit 802 to reception at the moment the data to be transmitted end and waits for the reception frame. When the reception frame is received, the wireless controller 805 descrambles the data and extracts control information and data from the reception frame. This control information is delivered to the CPU 804 through the CPU I/F 807.

In a case where the reception frame is a PCF or PPF, the received data are delivered to the ADPCM codec i/f 806. If the channel codec is used in a wireless telephone, the data are outputted as audio via the ADPCM codec 803. If the channel codec is used in the main unit, the data are sent to the speech channel. In a case where the received frame is a BDF, the received data are transferred to a memory within data terminal.

(3) Handling of Logical Control Data (3-1) At Time of No Communication

At the time of no communication, the LCCH-T from the main unit sent periodically is received while standing by at the frequency allocated by the main unit in advance. The LCCH sent from the main unit contains information for verifying whether a call has been terminated on an outside line and whether a call originating request has been sent to a wireless telephone. The wireless telephone sends the CPU the LCCH extracted by the reception frame processor. Thereafter, the designated LCCH to be sent from the CPU to the main unit is sent to the main unit as LCCH-R. Thus, the wireless telephone repeats the above-described procedure until an outgoing call or incoming call is generated.

(3-2) At Time of Communication

A case in which a wireless telephone A is called will be described as an example.

Assume that the wireless telephone A is exchanging the LCCH with the main unit on the frequency channel F1 at the time of wireless communication. The wireless telephone A monitors the LCCH from the main unit on the frequency channel F1 through the procedure, described in (3-1) above, until an outgoing call is generated. When the outgoing call is generated at the wireless telephone A, the latter places an outgoing-call request in the LCCH-R, which is to be sent to the main unit, through the procedure set forth in (3-1) above, and sends the LCCH-R to the main unit. The LCCH notifying of whether communication is possible from the side of the main unit is judged by the LCCH sent on the frequency channel F1 100 ms later.

In a case where the content of the LCCH from the main unit following the origination request cannot be connected because the line is occupied, the wireless telephone A so notifies the user in the form of a busy signal. However, if the content of the LCCH from the main unit following the origination request indicates that connection is possible, a time slot of the voice channel used for speech in the same LCCH-T is designated. For example, if "1" is designated, this indicates that communication is performed using T1 and R1. Communication is performed while the frequency channel is changed over by the frequency hopping pattern designated by the TS and NFR in the FSYN frame. The exchange of control information after the connection is made to the main unit is carried out by the D-channel information within the Tn and Rn frames.

In case of communication between wireless telephones, the exchange of control information between the wireless telephones is performed using the D-channel information. The LCCH-R of the frequency channel designated by each wireless telephone is exchanged with the main unit after communication ends. More specifically, when, in the case mentioned above, the wireless telephone A exchanges control information with the main unit on the frequency channel F1 at the time of wireless communication, the wireless telephone notifies the main unit of the fact that communication between the wireless telephones has ended.

<Frequency-Hopping Pattern>

Figure 16:
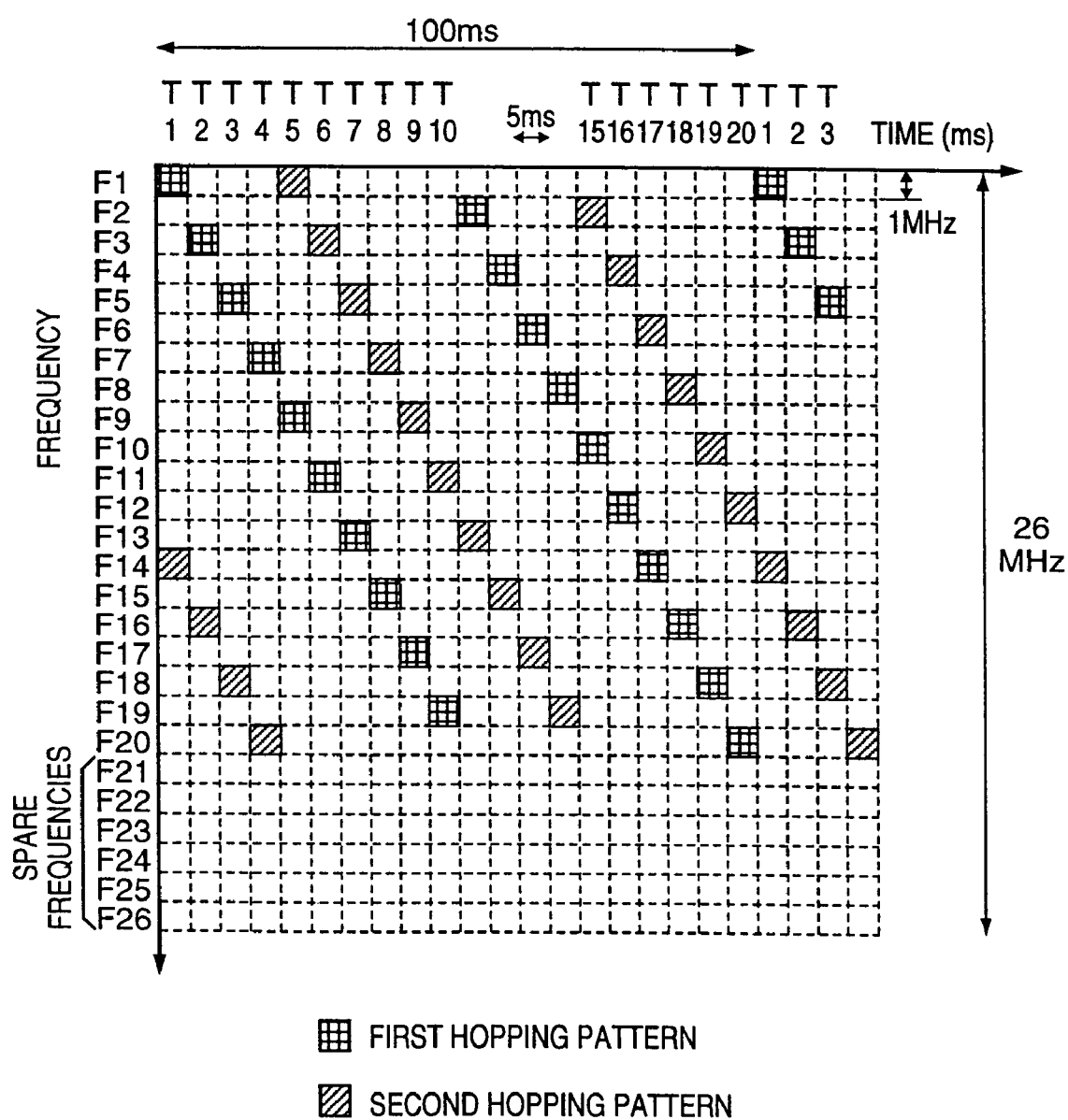
FIG. 16 is a diagram showing the concept of frequency hopping in this system.

FIG. 16 is a diagram showing the concept of frequency hopping in this system.

In this system according to this embodiment, use is made of 26 frequency channels having a width of 1 MHz, utilizing a frequency band of 26 MHz. If consideration is given to cases in which there are frequencies that cannot be used because of interference noise, 20 frequency channels are selected from the 26 channels and frequency hopping is carried out over the selected frequency channels in a predetermined order.

In this system, one frame of communication data has a length of 5 ms and frequency channels are hopped every frame, as illustrated in FIG. 8, by way of example. Consequently the length of the period of one hopping pattern is 100 ms.

In FIG. 16, different hopping patterns are indicated by different designs. Patterns in which the same frequencies are not used at the same times are employed by each frame. As a result, it is possible to prevent the occurrence of data errors. In a case where a plurality of connecting devices are accommodated, different hopping patterns are used by the connecting devices in order to avoid interference between the connecting devices. This method makes it possible to realize a system having a multicell architecture, as a result of which a wide service area can be obtained.

<Details of Operation>

In this system, as described above, frames are assembled in order to perform communication between the main unit and wireless telephones or data terminals and between the terminals and control operation is performed to change over the frequency used for communicating the frames at fixed time intervals.

The concrete operation of the system will now be described in detail.

<Basic Operation Procedure>

In this system, slots used and frequency hopping patterns are decided, before a communication channel is used, by employing logical control information (LCCH-T and LCCH-R) time-division multiplexed within frames. Furthermore, in order to make it possible for each terminal to perform intermittent reception in order to conserve power, each terminal is designed to perform transmission and reception solely in the logical control channel transmitted at the frequency allocated beforehand.

Immediately after power is introduced, the terminal cannot recognize the hopping pattern. Accordingly, the terminal stands by at any frequency and receives a frame at this frequency. When the first frame is received, the frequency information of the next frame contained in this frame is accepted and frequency hopping is started from this point onward. In a case where a plurality of connecting devices are being used, the hopping pattern used by the connecting device that could receive the frame first is followed up.

Further, immediately after start-up by introduction of power, which terminals will be allocated to what frequencies is not yet decided. At start-up, therefore, an ID is registered for each terminal and allocation of logical control channel frequencies are allocated in the setting mode. When a logical control channel is allocated, each terminal is placed in an intermittent reception state and only logical control data destined for the terminal itself is received. Data for transmission to the main unit is transmitted to the main unit using the LCCH-R of the allocated frequency only in a case where data for transmission to the main unit has been generated.

In a case where it is desired to start communication using a call slot, the logical control channel is used to so notify the main unit and the allocation of slots and hopping patterns is received. After the allocation is made, it is possible to carry on a telephone conversation or to transmit data.

<Operation (Setting Mode) at Introduction of Power to Main Unit (Connecting device) and Wireless Terminal>

This mode for registering IDs and for setting the frequencies of logical control channels used.

Figure 17:
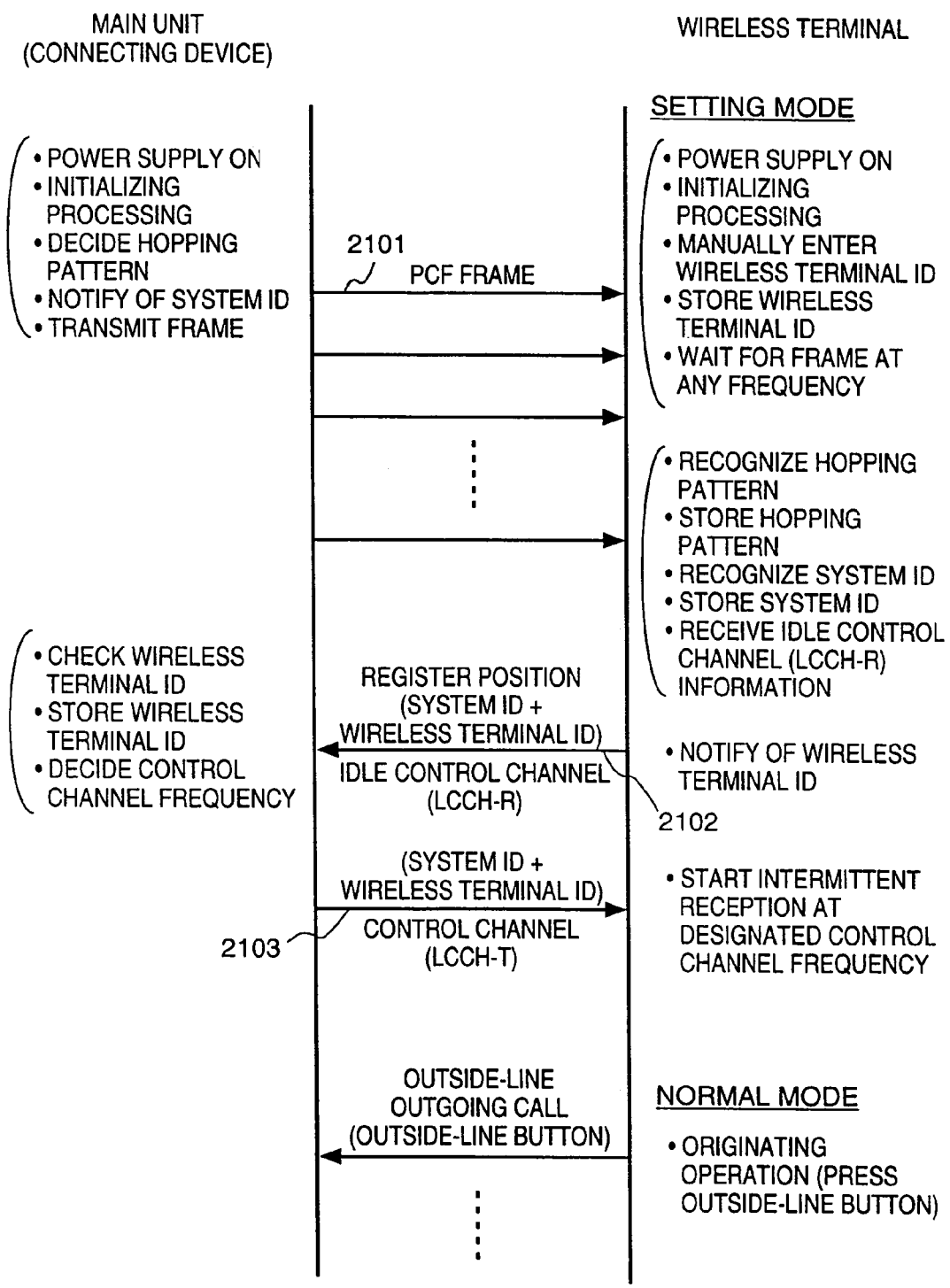
FIG. 17 is a sequence diagram showing operation when power is introduced to the main unit (connecting device) and wireless terminals.
Figure 18:
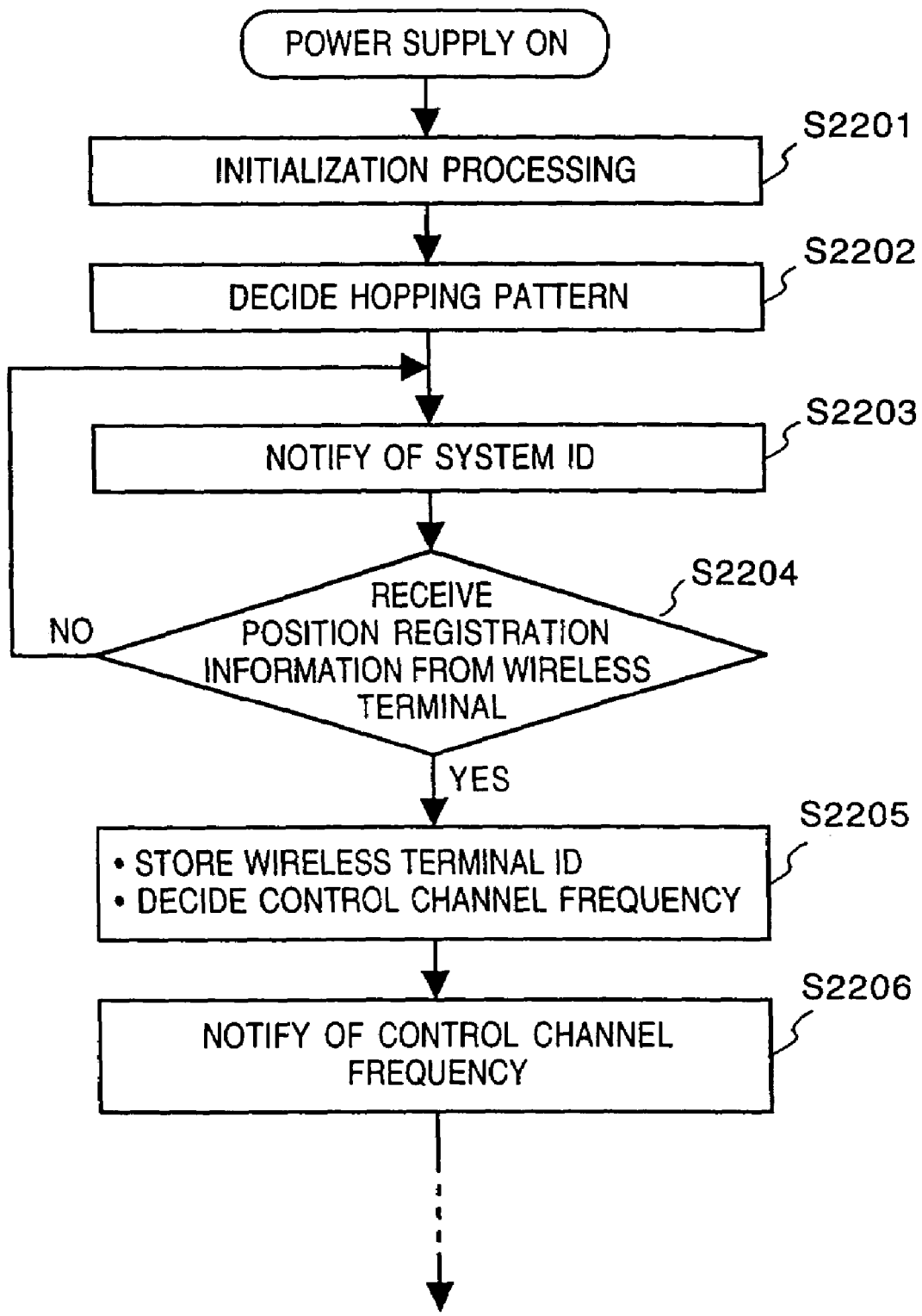
FIG. 18 is a flowchart showing operation when power is introduced to the main unit (connecting device)
Figure 19:
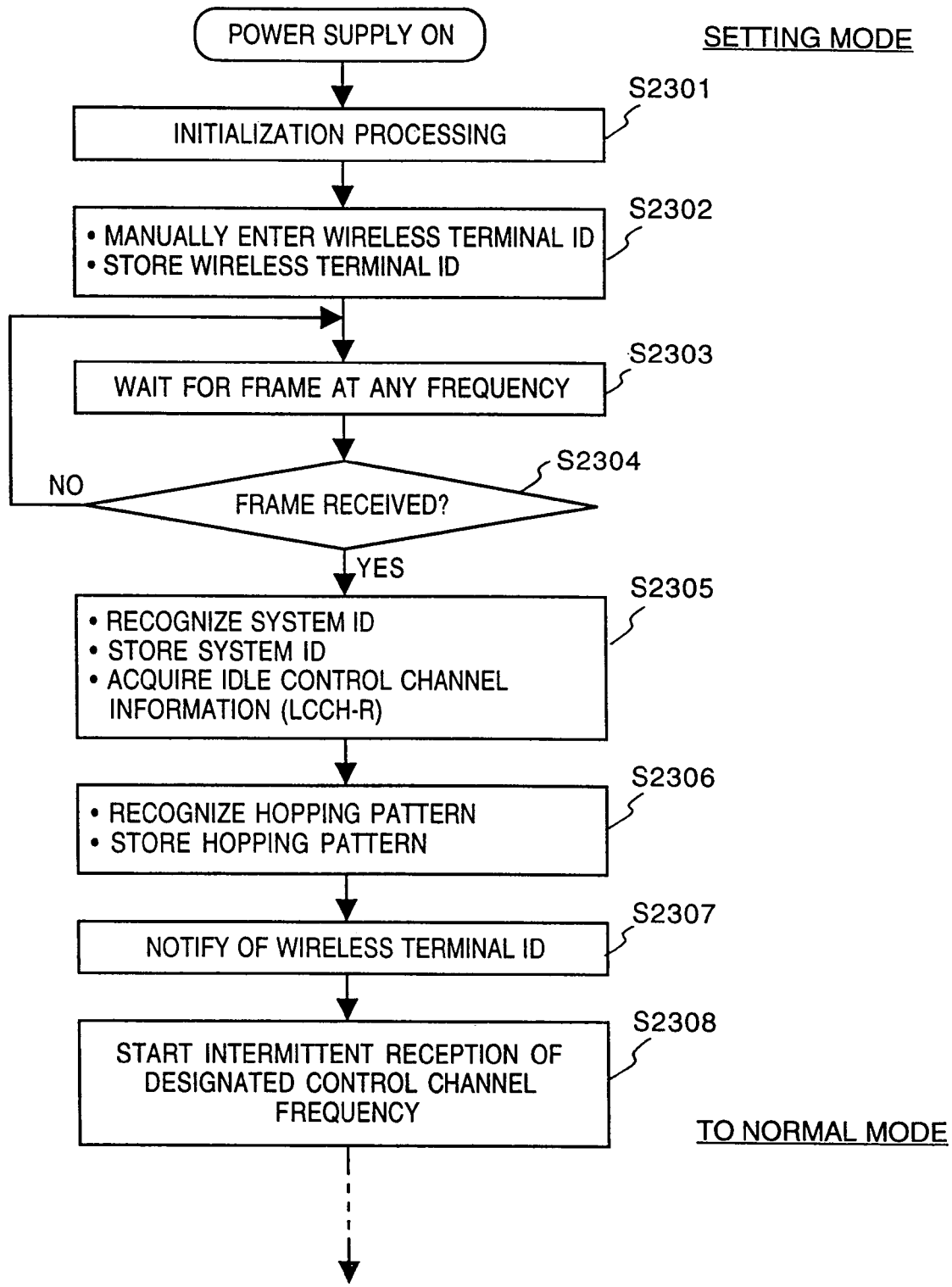
FIG. 19 is a flowchart showing operation when power is introduced to a wireless terminal.

FIG. 17 is a sequence diagram showing operation when power is introduced to the main unit (connecting device) and a wireless terminals, FIG. 18 is a flowchart showing operation when power is introduced to the main unit, and FIG. 19 is a flowchart showing operation when power is introduced to the wireless terminal.

(1) Operation at Introduction of Power to Main Unit (Connecting Device)

When a power-supply switch (not shown) on the main body of the main unit 1 (connecting device 2) shown in FIG. 1 is closed, the main unit 1 (connecting device 2) initially sets the main body at step S2201 in FIG. 18. Next, the hopping pattern of frequency hopping used in wireless communication is decided at step S2202. Next, at step S2203, the above-mentioned hopping pattern (the frequency hopped to in the next unit of time) and the PCF frame to which the ID of this system has been appended are transmitted to the wireless terminal 103 (see FIG. 1).

The system ID is included in the ID field (see FIG. 11) of the PCF frame, and the information relating to the frequency hopped to in the next unit of time according to the above-mentioned hopping pattern is included in the NFR field. Further, information relating to an idle control channel capable of being used on the side of the wireless terminal is included in the LCCH field (see FIG. 13).

Next, when the main unit 1 (connecting device 2) determines that information for position registration such as the system ID and wireless terminal ID from the wireless terminal 103 has been received ("YES" at step S2204), the ID of the wireless terminal 103 is stored and the control channel for transmitting the wireless communication control information addressed to the wireless terminal 103 is decided at step S2205. The wireless terminal 103 is so notified at step S2206.

The above-described operation corresponds to the sequence 2101~2103 shown in FIG. 17.

(2) Operation at Introduction of Power to Wireless Terminal

When the power-supply switch on the main body of the wireless terminal 103 is closed, the setting mode is established and the wireless terminal 103 initially sets the main body, as indicated at step S2301 in FIG. 19. Next, when the ID of the wireless terminal 103 is manually entered at step S2302, the wireless terminal 103 stores this ID.

When the PCF frame is received from the main unit 1 (connecting device 2) at step S2302, a transition is made to a state in which reception at an arbitrary frequency is awaited. Next, if the PCF frame from the main unit 1 (connecting device 2) could be received at step S2304, the program proceeds to step S2305. Here the system ID is recognized from the ID field (see FIG. 11) in the PCF frame, the system ID is stored in memory, and the idle channel information (the frequency for transmitting the PCF frame from the wireless terminal to the main unit) is acquired from the LCCH field (see FIG. 13). Further, the frequency hopped to in the next unit of time is acquired from the NFR field in the PCF frame and the wireless terminal 103 shifts the reception frequency to the acquired frequency and waits for the next PCF frame. The wireless terminal 103 repeats this operation, recognizes the hopping pattern of the frequency and stores this (step S2306).

When the hopping pattern and system ID are ascertained, the wireless terminal 103 transmits the frame (see sequence 2102 in FIG. 17) to which the system ID and the ID information of the wireless terminal itself have been appended to the address of the main unit using the idle control channel obtained from the LCCH field (step S2307).

If the information designating the control channel frequency is received from the main unit 1 (connecting device 2) after the above-mentioned processing, the wireless terminal 103 starts intermittent reception (step S2308) on the designated channel and effects a transition from the setting mode to the normal mode.

<Processing for Outgoing Call on Outside Line from Wireless Telephone>

Figure 20:
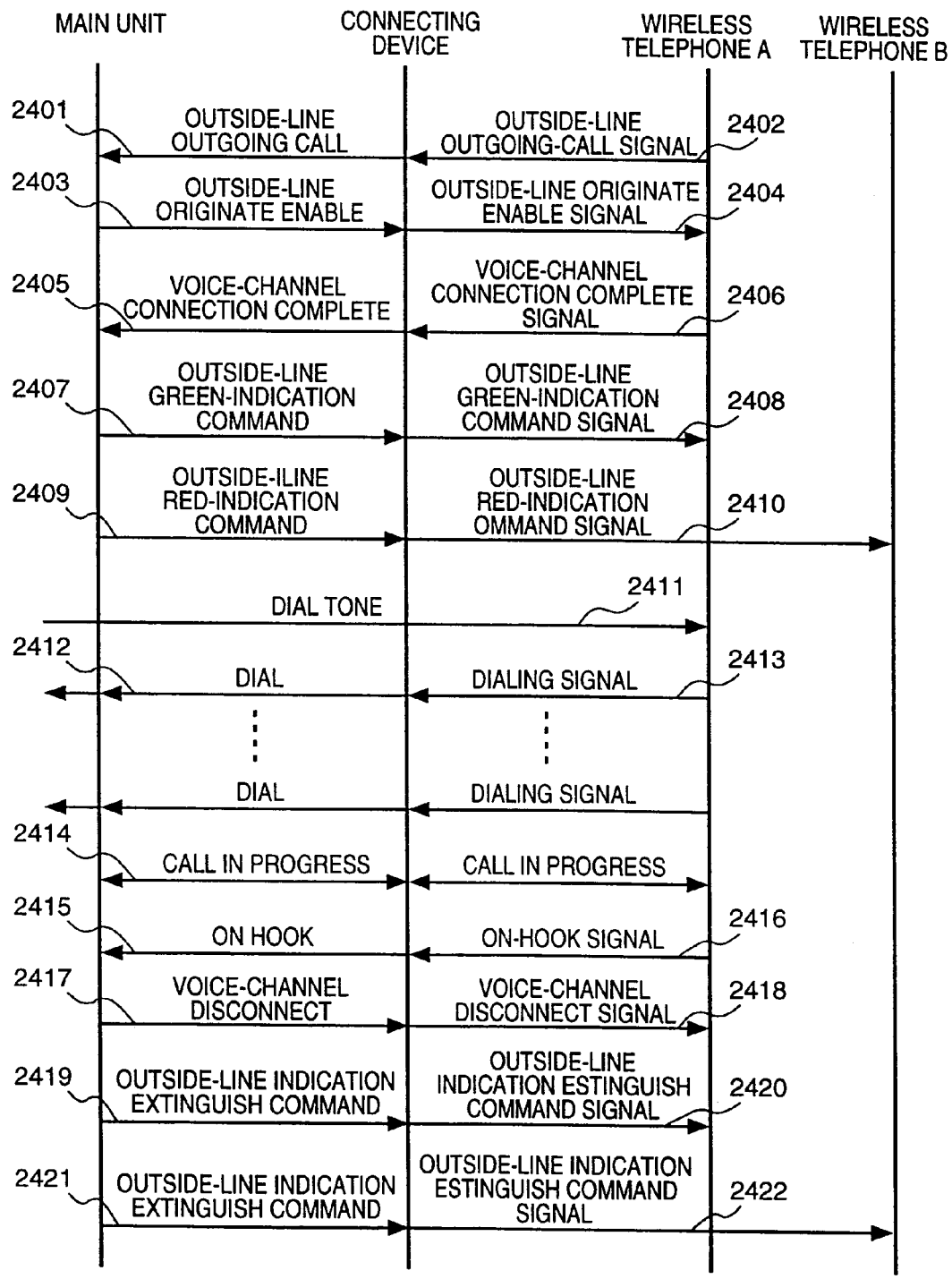
FIG. 20 is a sequence diagram showing origination of a call on an outside line according to an embodiment of the invention.
Figure 21:
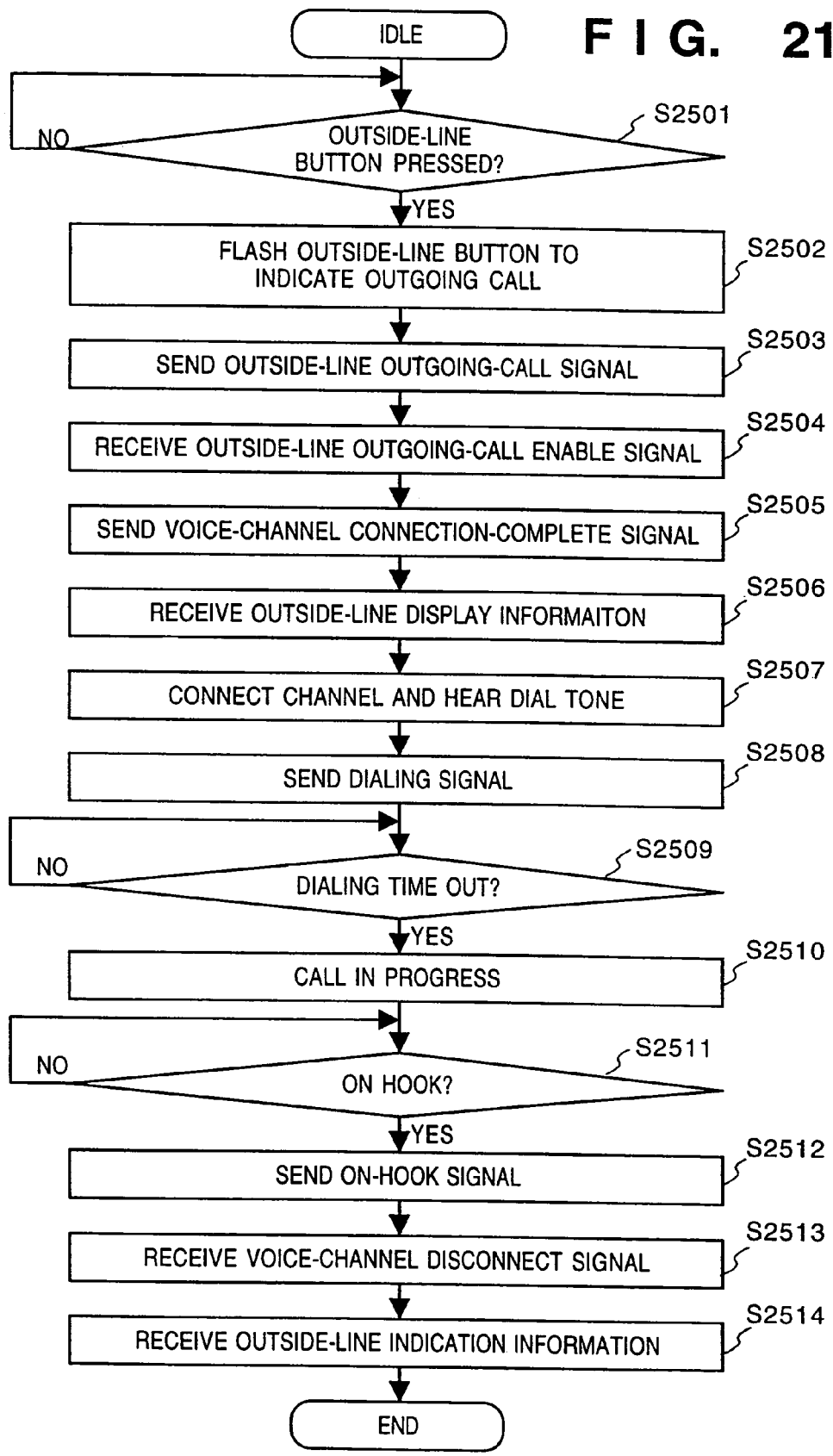
FIG. 21 is a flowchart showing the operation of a wireless telephone when a call is originated on an outside line.
Figure 22:
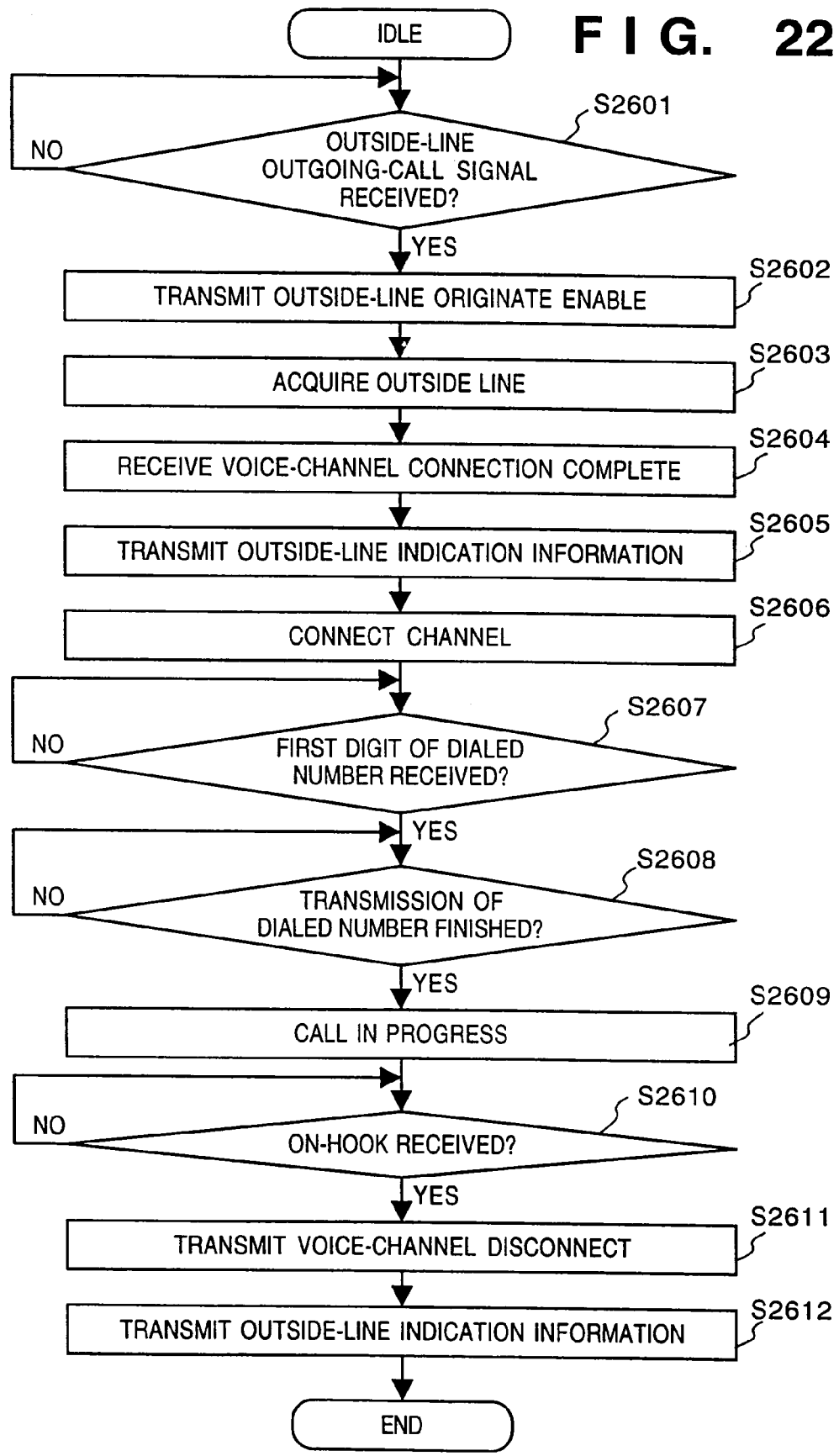
FIG. 22 is a flowchart showing operation of the main unit when a call is originated on an outside line.

FIG. 20 is a sequence diagram showing origination of a call on an outside line according to this embodiment of the invention, FIG. 21 is a flowchart showing the operation of the wireless telephone 3 when a call is originated on an outside line, and FIG. 22 is a flowchart showing operation of the main unit 1 when a call is originated on an outside line.

When an outside-line key belonging to the key matrix 413 on the wireless telephone 3 of this embodiment is pressed (step S2501 in FIG. 21), the wireless telephone 3 causes an outside line LED on the display unit 414 corresponding to the pressed outside-line key to flash to indicate an outgoing call (step S2502) and transmits an outside-line outgoing-call signal (2402 in FIG. 20) to the main unit 1 via the connecting device 2 (step S2503). This outside-line outgoing-call signal is transmitted by way of the LCCH-R in the PCF frame of FIG. 8 using the wireless link between the wireless telephone 3 and connecting device 2. The connecting device 2 notifies the main unit by means of the main unit i/f 305 in FIG. 3.

Upon receiving the outside-line outgoing-call signal (2401 in FIG. 20), the main unit 1 determines whether origination of a call on the outside line is possible (step S2601 in FIG. 22). If the outside line is idle and the call is capable of being originated, the main unit 1 decides the outside line for originating the call and which voice channel (T1~T4, R1~R4) of the PCF frame is to be used. The main unit 1 transmits outside-line originate enable (2403), in which the number of the decided voice channel is a parameter, to the wireless telephone 3 via the connecting device 2 (step S2602) and acquires the outside line (step S2603). In addition, the main unit 1 places this voice channel in use. Outside-line originate enable is transmitted by the LCCH-T of the PCF frame.

Upon receiving a signal (2404) indicative of outside-line originate enable (step S2504), the wireless telephone 3 establishes synchronization with the voice channel designated by the parameter sent with the outside-line originate enable signal. The voice data are then transmitted via this voice channel. More specifically, the voice data are communicated in the B time slot shown in FIG. 12. When the transition to the voice channel by the wireless telephone 3 is completed, the wireless telephone 3 transmits a signal (2406) indicating that connection of the voice channel is completed.

At the moment outside-line originate enable (2403) is received from the main unit 1, the connecting device 2 receives the predetermined voice channel by the channel codec 307, creates a path for delivering this to the main unit 1 and communicates the voice-channel connection complete signal (2406) from the wireless telephone 3 to the main unit 1 as voice-channel connection complete (2405).

Upon receiving voice-channel connection complete (2405) (step S2604), the main unit 1 judges that preparations on the side of the wireless telephone have been made and sends the connecting device 2 an outside-line green-indication command (2407) in order to light the outside-line LED in the color green, by way of example (step S2605). In addition, the main unit 1 effects connection of a channel with the acquired outside line (step S2606).

On the other hand, the wireless telephone 3 receives an outside-line green-indication command signal (2408) from the connecting device 2 (step S2506), lights the outside-line LED in the color green, connects the channel internally and causes the user to hear a dial tone (2411) (step S2507).

In order that outside-line LEDs corresponding to wireless telephones other than the wireless telephone 3 that placed the outgoing call on the outside line will be lit in the color red, the main unit 1 transmits an outside-line red-indication command (2409, 2410) via the connecting device 2.

Next, the wireless telephone 3 at which the dialing operation has been performed at the key matrix 413 transmits a dialing signal (2413) to the main unit 1 (step S2508). The end of the dialing operation is monitored by time-out (step S2509). When time-out is reached, call-in-progress is established (step S2510).

When the first digit of dialing (2412) is received (step S2607), the main unit 1 begins transmitting the dialing signal to the outside line and monitors the dialed number transmission by time-out (step S2608). When transmission of the dialed number ends, call-in-progress is established (step S2609).

When the call ends and the wireless telephone 3 is hung up ("YES" at step S2511), an on-hook signal (2416) is sent to the connecting device 2 (step S2512). When on-hook (2415) is transmitted to the main unit 1 ("YES" at step S2610), the main unit 1 transmits voice-channel disconnect (2417) to the wireless telephone 3 via the connecting device 2 (step S2611). Furthermore, the main unit 1 cancels the allocation of the voice channel to the wireless telephone 3 and manages the voice channel as being in a state in which the channel is not in use. Thereafter, in order to extinguish the outside-line LED of the wireless telephone 3, the main unit 1 transmits an outside-line indication extinguish command (2419) and the connecting device 2 transmits an outside-line indication extinguish command signal (2420) (step S2612).

Upon receiving a voice-channel disconnect signal (2418), the wireless telephone 3 releases the channel (step S2513) and extinguishes the corresponding outside-line LED based upon the received outside-line indication extinguish command signal (2420, 2422) (step S2514).

<Processing for Incoming Call on Outside Line to Wireless Telephone>

Figure 23:
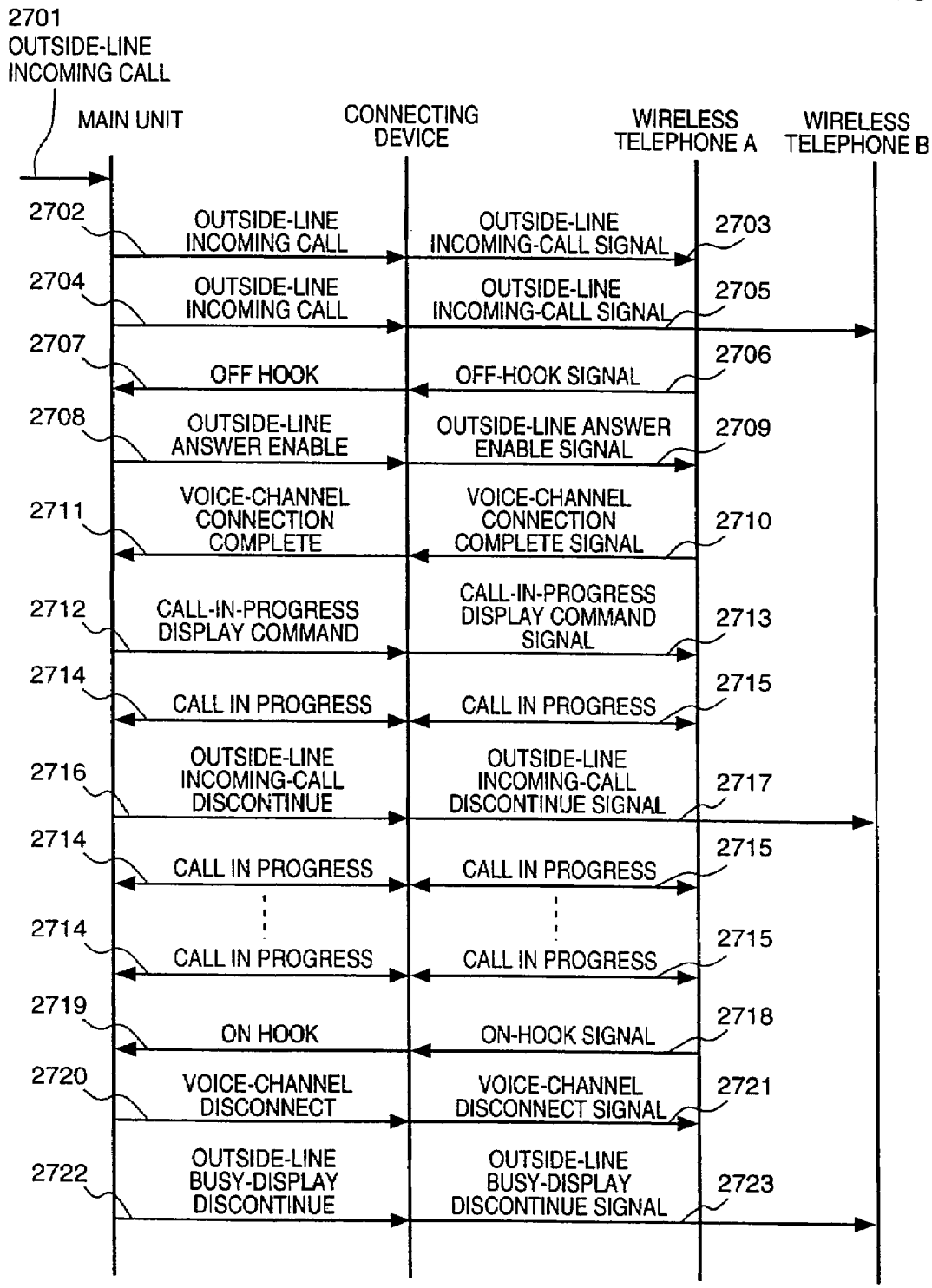
FIG. 23 is a sequence diagram for describing termination of an incoming call on an outside line according to the embodiment.
Figure 24:
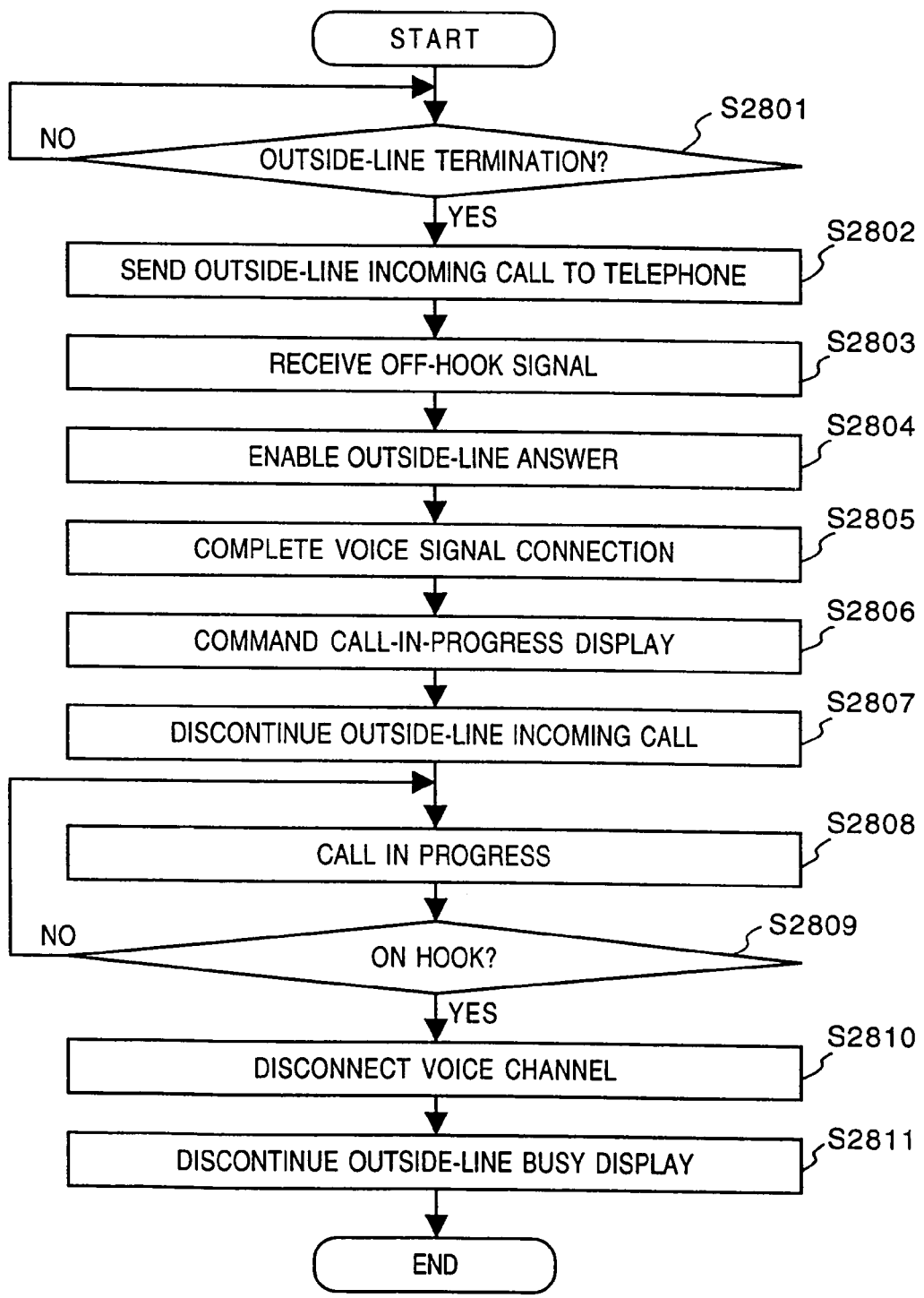
FIG. 24 is a flowchart showing operation of the main unit when a call is terminated on an outside line.

FIG. 23 is a sequence diagram for describing termination of an incoming call on an outside line according to this embodiment, and FIG. 24 is a flowchart showing operation of the main unit when a call is terminated on an outside line.

When it is determined at step S2801 in FIG. 24 that a call from the public switched telephone line 102 has been terminated at the main unit 1, the main unit 1 transmits outside-line incoming calls 2703, 2705 to the wireless telephones 103-A, 103-B from the connecting device 2 through the LCCH-T at step S2802. If an off-hook signal 2706 is received by LCCH-R at step S2803, the program proceeds to step S2804. Here an outside-line answer enable signal 2709 carrying information indicating the hopping pattern and voice-channel number used in the outside-line call is transmitted through the LCCH-T to the wireless telephone that transmitted the off-hook signal 2706, and this voice channel is managed as being in use.

The wireless telephone taken off the hook will now be described as being the wireless telephone 103-A (see FIG. 1).

If a voice-channel connection complete signal 2711 is received through LCCH-R at step S2805, the program proceeds to step S2806, where the main unit 1 sends the connecting device 2 and wireless telephone 103-A call-in-progress display signals 2712, 2713 through LCCH-T. Next, at step S2807, the main unit 1 transmits an outside-line incoming call discontinue signal 2717 to the wireless telephone 103-B, which is the other wireless telephone 103-B, through the LCCH-T. This is followed by step S2808, at which the main unit 1 connects the wireless telephone 103-A to the public switched telephone line 102 and starts a call using the designated voice channel on the basis of data from the wireless telephone 103-A. At this time call-in-progress 2715 is exchanged as data.

Furthermore, the main unit 1 maintains the connection to the wireless telephone 103-A and public switched telephone line 102 until an on-hook signal 2718 is received from the wireless telephone 103-A at step S2809. If the on-hook signal 2718 has been received through the LCCH-R, the program proceeds to step S2810, at which the main unit 1 discontinues the connection between the wireless telephone 103-A and public switched telephone line 102 and issues a voice-channel disconnect signal 2721 through the LCCH-T. Next, at step S2811, the main unit 1 transmits an outside-line busy display discontinue signal 2723 to the wireless telephone 103-B and places the voice channel in the unused state.

Figure 25:
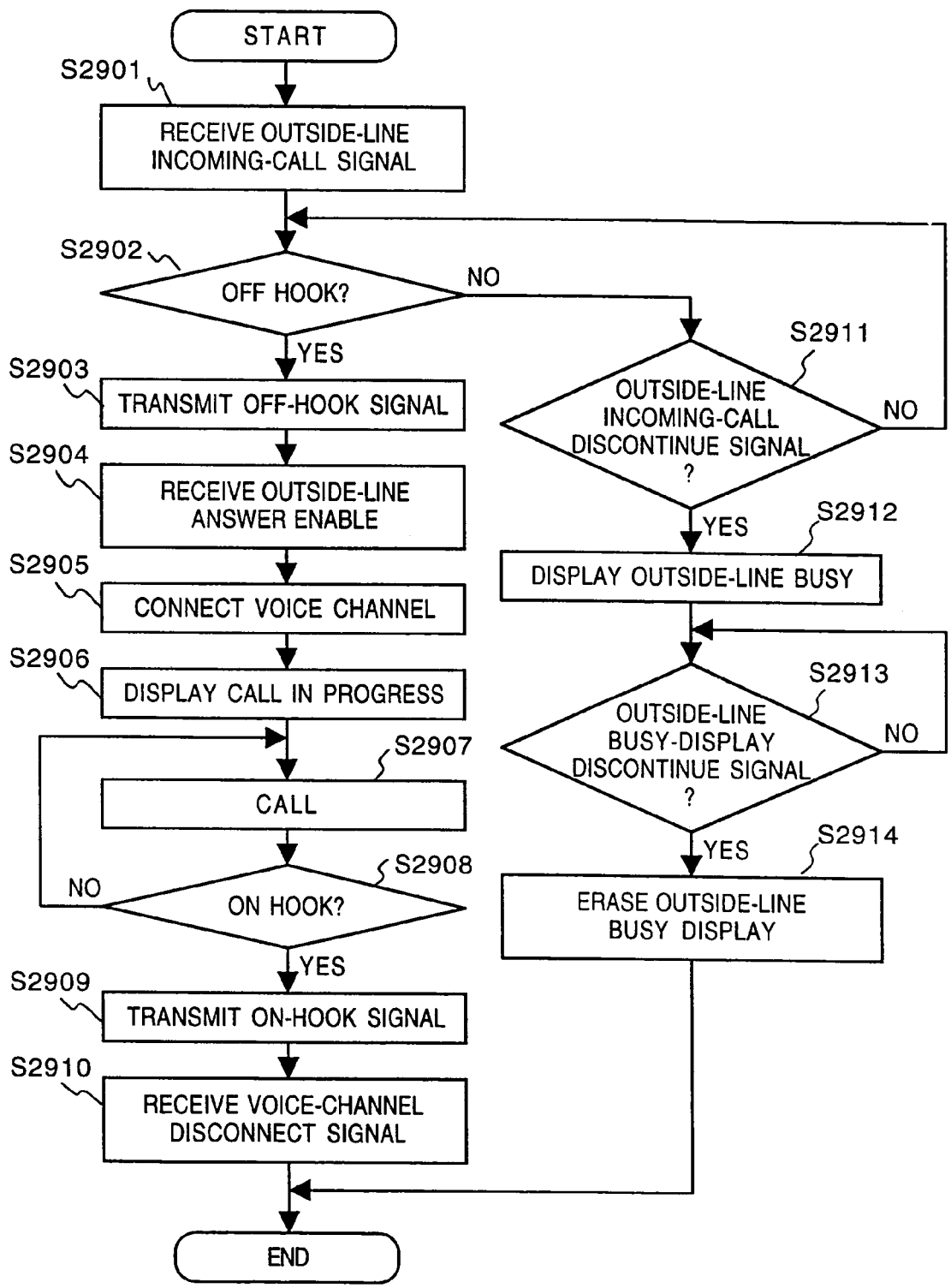
FIG. 25 is a flowchart showing operation of the wireless telephone when a call is terminated on an outside line.

FIG. 25 is a flowchart showing operation of the wireless telephone when a call is terminated on an outside line according to this embodiment. When wireless telephones receive the outside-line incoming-call signal (2703 in FIG. 23) from the main unit 1 through LCCH-T, the wireless telephones 103-A, 103-B issue an incoming-call tone and sense whether they have been taken off the hook at step S2902. If wireless telephone 10A-3 has been taken off the hook, the program proceeds to step S2903, at which the off-hook signal 2706 is transmitted to the main unit 1 using the LCCH-R. If the outside-line answer enable signal 2709 has been sent from the main unit 1, the voice channel is connected at step S2905 and a voice-channel connection complete signal 2710 is transmitted to the main unit 1 using LCCH-R.

If the call-in-progress display signals 2713 has been sent from the main unit 1 via the connecting device 2 using the LCCH-T at step S2906, the wireless telephone 103-A causes the display unit 414 to display the fact that a call is in progress and starts a call at step S2907. Furthermore, the call is maintained until the on-hook state is detected at step S2908. If the on-hook state is detected, the on-hook signal 2718 is sent to the connecting device 2 using LCCH-R at step S2909. As a result, on-hook is transmitted to the main unit 1.

If the voice-channel disconnect signal 2721 is received through LCCH-T at step S2910, the wireless telephone 103-A disconnects the voice channel, causes the call-in-progress display to be erased from the display unit 414 and ends the call. Discontinuation of the call-in-progress display is performed in accordance with the outside-line busy display discontinue signal 2723.

If it is found at step S2911 that the outside-line incoming-call discontinue signal is received without a certain wireless telephone being taken off the hook at step S2902 (in accordance with this embodiment, the outside-line incoming call discontinue signal 2717 is transmitted to the wireless telephone 103-B from the main unit 1 because the other wireless telephone 103-A has started a call), the wireless telephone 103-B causes the display unit 414 to display that the outside line is in use at step S2912. Furthermore, the wireless telephone 103-B causes the display unit 414 to continue the outside-line busy display until the outside-line busy display discontinue signal 2723 is detected to arrive at step S2913. If the outside-line busy display discontinue signal 2723 has been received, the outside-line busy display is erased at step S2914.

<Processing for Call Between Extensions>

An extension call between wireless telephones will be described next. To facilitate the description, a case will be assumed in which the call is managed using the same connecting device. In other words, when communication is performed with the main unit, it will be assumed that two wireless telephones perform an extension call through the intermediary of the same connecting device. Under this assumption, the operation of the wireless telephone on the originating side and the operation of the wireless telephone on the terminating side will be described in detail.

Figure 26:
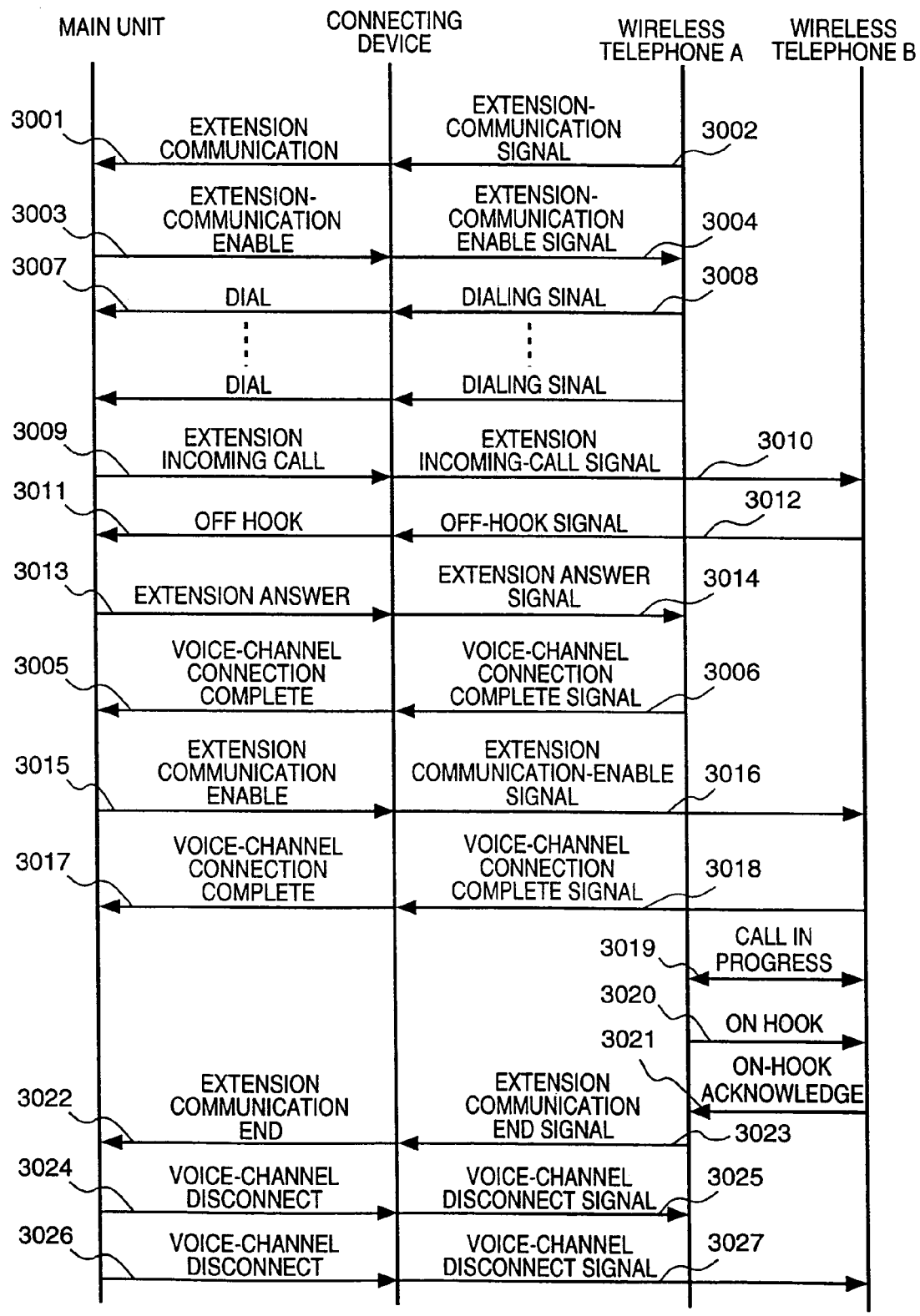
FIG. 26 is a sequence diagram showing the flow of data in the main unit, connecting device, dedicated telephone on the originating side and dedicated telephone on the terminating side.
Figure 27:
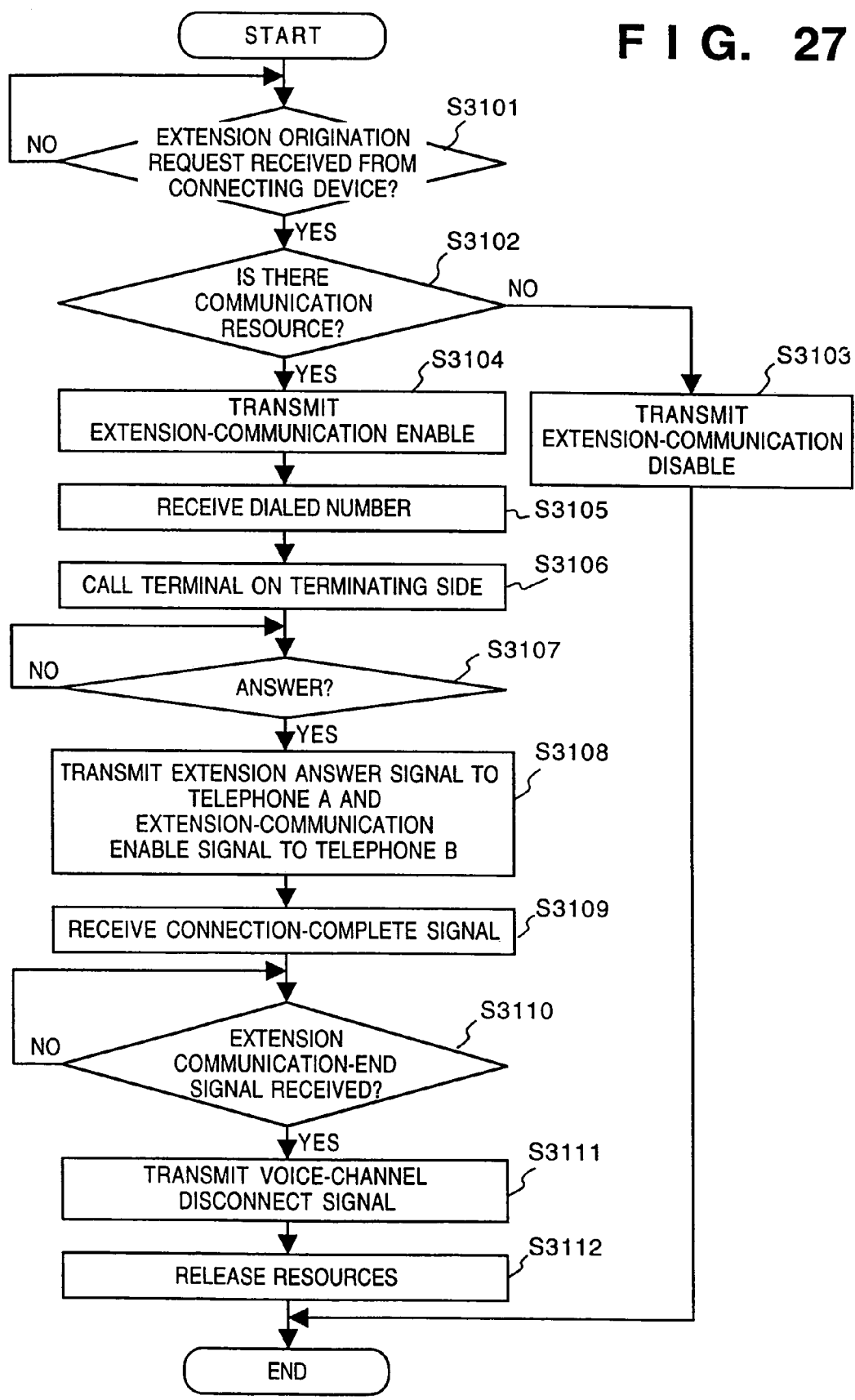
FIG. 27 is a flowchart showing processing executed by the main unit when communication is performed between extensions.
Figure 28:
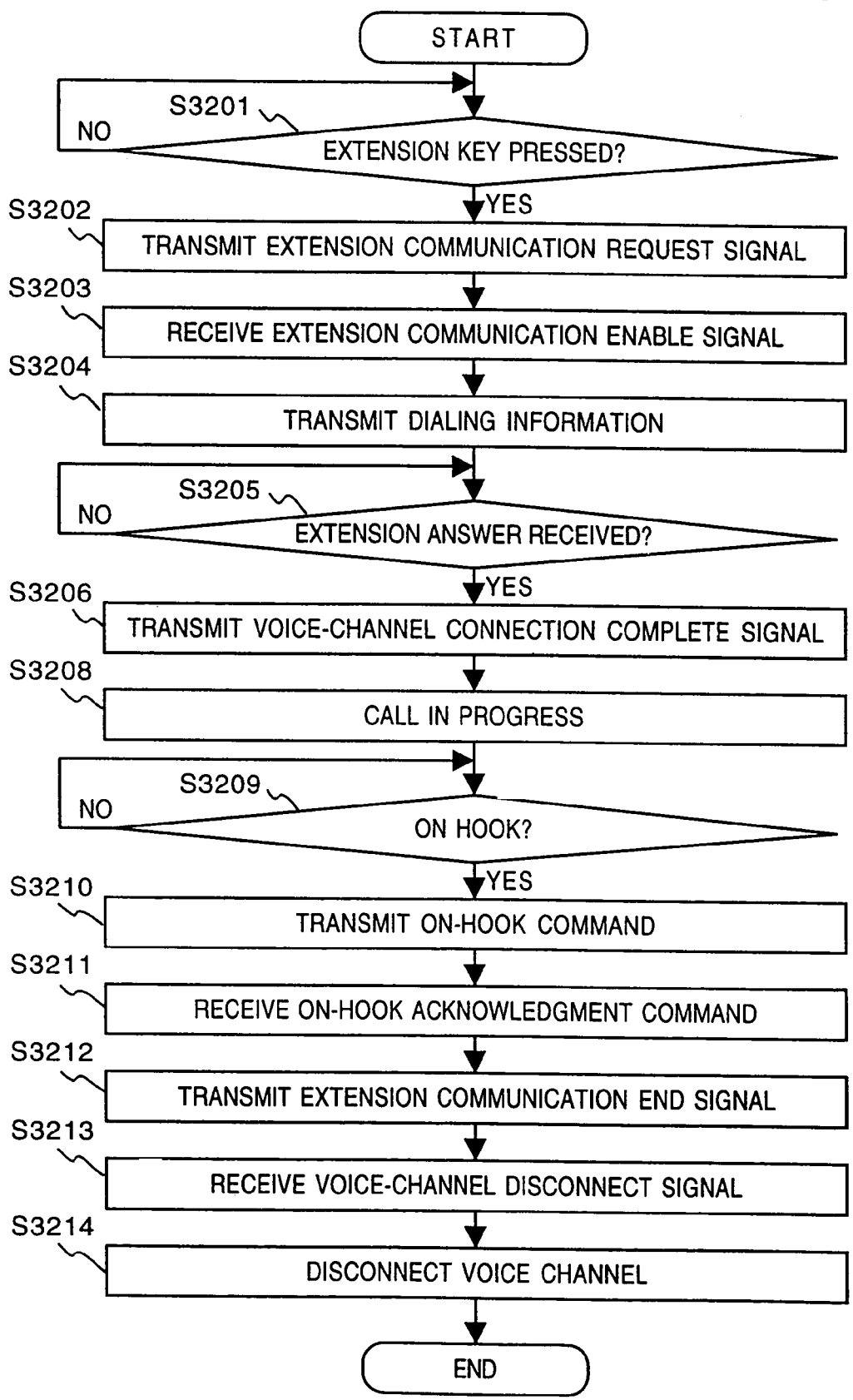
FIG. 28 is a flowchart showing processing executed by a dedicated telephone on the originating side.
Figure 29:
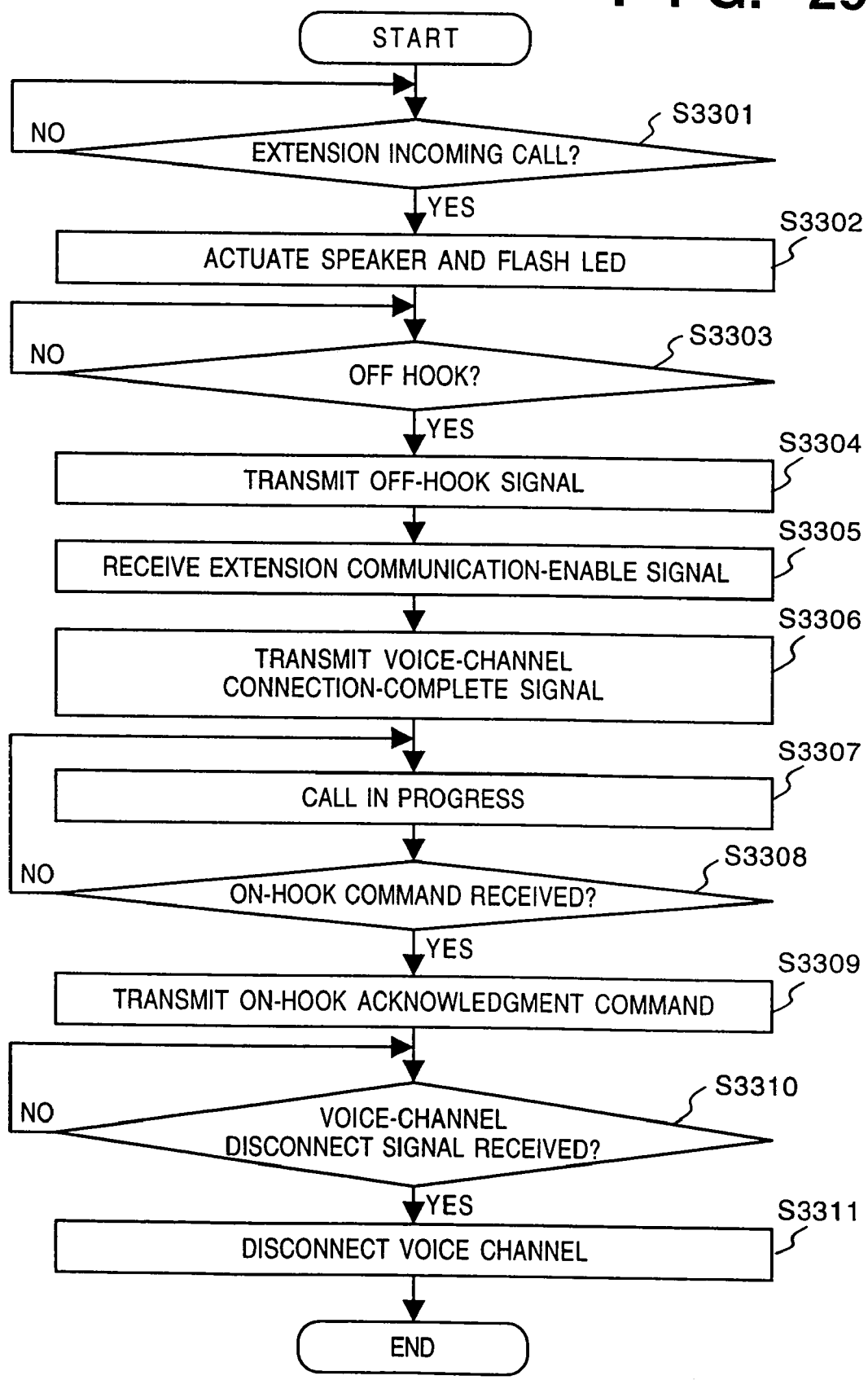
FIG. 29 is a flowchart showing processing executed by a dedicated telephone on the terminating side

FIG. 26 is a sequence diagram showing the flow of data in the main unit, connecting device, leased telephone on the originating side (wireless telephone 103-A) and leased telephone on the terminating side (wireless telephone 103-B). FIG. 27 is a flowchart showing processing executed by the main unit when communication is performed between extensions. FIG. 28 is a flowchart showing processing executed by the leased telephone on the originating side, and FIG. 29 is a flowchart showing processing executed by the leased telephone on the terminating side. In the flowcharts mentioned above, only the processing steps that have a bearing upon the invention are written.

When an extension key on the key matrix 413 is pressed ("YES" at step S3201 in FIG. 28) at the wireless telephone 103-A, the latter transmits an extension communication signal (3002 in FIG. 28) on the wireless link between the wireless telephone 103-A and connecting device 2 using the LCCH-R in the PCF frame of FIG. 8 (step S3202). Upon receiving the extension communication signal (3002) sent, the connecting device 2 notifies the main unit 1 of extension communication (3001).

Upon receiving the signal indicative of the extension communication (3001) at step S3101 in FIG. 27, the CPU 201 in the main unit 1 analyzes the terminal attribute of the originating wireless telephone 103-A and, if an outgoing call on the extension is possible ("YES" at step S3102), sends extension-communication enable (3003) to the connecting device 2 using the LCCH-T of the PCF frame. As a result, an extension-communication enable signal (3004) is transmitted from the connecting device 2 to the wireless telephone 103-A (step S3104).

If "NO" is rendered at step S3102, the CPU 201 sends extension-communication disable notification to the device 2 at step S3103.

Next, upon receiving dialing information from the matrix key 413, the wireless telephone 103-A transmits dialing information (3008) to the connecting device 2 using the LCCH-R of the PCF frame (step S3204). The end of dialing is monitored by time-out.

Upon receiving the dialing information (3007) from the connecting device 2 (step S3105 in FIG. 27), the main unit 1 analyzes the content of the dialing information and transmits extension incoming call (3009, 3010) using the LCCH-T of the PCF frame to the wireless telephone 103-B, which has been designated by the dialing information, via the connecting device 2 (step S3106). Upon receiving the extension incoming-call signal (3010) at step S3301 in FIG. 29, the wireless telephone 103-B causes the speaker 412 to issue a ringing tone and flashes the LED to inform the operator of the call and to prompt a response (step S3302 in FIG. 29). The wireless telephone 103-B then waits for the user to operate the key matrix 413 and answer the call.

If an answer from the user is detected at step S3303, the wireless telephone 103-B sends an off-hook signal (3012) to the connecting device 2 using the LCCH-R of the PCF frame, and the connecting device 2 notifies the main unit 1 of the off-hook state (3011) (step S3304).

Upon receiving off-hook (3012) from the wireless telephone 103-B ("YES" at step S3107), the main unit 1 sends extension answer (3013) to the connecting device 2 and the connecting device 2 transmits extension answer (3014) to the wireless telephone 103-A using the LCCH-T of the PCF frame, thereby giving notice of the fact that the wireless telephone 103-B has answered. In this extension answer (3013), the CPU 201 in the main unit 1 allocates communication resources, such as the idle time slot and hopping pattern stored in the RAM 203 and the voice channel (T1~T3, R1~R3) in the PPF frame used, to direct communication between the wireless telephone 103-A and wireless telephone 103-B, and transmits this communication resource information to the wireless telephone 103-A via the connecting device 2 as an extension answer (3014) using the LCCH-T of the PCF frame (step S3108). The main unit 1 places the time slot of the allocated hopping pattern in the used state.

Upon receiving the extension-answer signal (3014) (step S3205), the wireless telephone 103-A sends the connecting device 2 a voice-channel connection complete signal (3006) using the LCCH-R (step S3206). Upon receiving the voice-channel connection complete signal from the wireless telephone 103-A (step S3104), the connecting device 2 communicates a voice-channel connection complete command (3005) to the main unit 1. At same time, the main unit 1 also transmits extension communication enable (3015, 3016), which contains communication resource information such as the hopping pattern and voice channel used in direction communication, to the wireless telephone 103-B via the connecting device 2 (step S3108).

Upon verifying the answer from the other party by means of the extension-answer signal (3014), the wireless telephone 103-A halts the ring-back tone, effects a changeover to the logical channel allocated so as to implement the call to the communicating party and controls the microphone 411 and speaker 412, thereby establishing the call to the party (step S3208).

Upon receiving the extension communication-enable signal (3016) (step S3305), the wireless telephone 103-B halts the ringing tone, transmits voice-signal connection-complete signals (3017, 3018) to the main unit 1 via the connecting device 2 using the LCCH-R of the PCF frame (step S3306) and effects synchronization to the voice channel of the PPF frame obtained from the communication resource information in the extension communication enable signal (3016).

In other words, when the wireless telephones communicate following the above-described processing, the control data and voice data exchanged between the telephones are directly communicated between the telephones on the above-mentioned voice channel without the intervention of the connecting device 2. More specifically, in Tn and Rn of the PPF frame shown in FIG. 9, the control data are communicated by the "D" time slot and the voice data are communication by the "B" time slot, as shown in FIG. 12.

It should be noted that reception of LCCH-T and transmission of LCCH-R are made possible by changing over to the frequency being transmitted by the PCF frame at the timing of the head of the frame also during the direct communication between the wireless telephones. If this arrangement is adopted, it will be possible for data from the main unit 1 to be received even during extension communication. This makes it possible to accommodate a service such as call termination during a call.

If the main unit 1 receives the voice-signal connection complete signal (3017) from the wireless telephone 103-B (step S3109), the main unit 1 judges that communication has started between the wireless telephone 103-A and the wireless telephone 103-B and waits for the end of extension communication (step S3110). Meanwhile, the wireless telephone 103-A and the wireless telephone 103-B monitor the status of the wireless link and the users operation of the key matrix 413.

When the call ends and the on-hook state is detected at the wireless telephone 103-A ("YES" at step S3209), the wireless telephone 103-A transmits an on-hook command (3020) to the wireless telephone 103-B (step S3210). Upon receiving the on-hook command (3020) (step S3308), the wireless telephone 103-B transmits an on-hook acknowledgment command (3021) to the wireless telephone 103-A as control information in the communication channel (step S3309).

Upon receiving the on-hook acknowledgment command (3021) at step S3211, the wireless telephone 103-A changes over the communication channel to the logical control channel and, after performing contention control, transmits an extension communication end signal (3023) to the connecting device 2 (step S3212). As a result, extension communication end (3022) is transmitted to the main unit 1. Accordingly, voice channel disconnect (3024) is transmitted from the main unit 1 to the connecting device 2 and a voice channel disconnect signal (3025) is transmitted from the connecting device 2 to the wireless telephone 103-A (steps S3213, S3214). Similarly, the main unit 1 transmits voice channel disconnect (3026, 3027) to the wireless telephone 103-B via the connecting device 2 (steps S3310, S3111).

Next, the main unit 1 releases the communication resources such as the voice channels allocated to the wireless-telephones 103-A, 103-B (step S3112). As a result, the wireless telephones 103-A, 103-B that have received the voice channel disconnect signals (3025, 3027) also release resources (steps S3213, S3214, S3310, S3311).

Thus, it is possible to realize direct communication between extensions. The basic portion of the above-described procedure can be used also when transmitting data from a computer to a printer, as will be described below.

Direct communication between wireless telephones managed by the same connecting device has been described above. In a case where direct communication is performed between wireless telephones managed by different connecting devices, an arrangement may be adopted in which the hopping pattern used in communication is decided by the CPU 201 of the main unit and communicated to each connecting device.

<Processing for Data Transmission from Computer to Printer>

The wireless communication system according to this embodiment is characterized in that high-speed data transmission is possible between extensions. Accordingly, processing for a case in which data is transmitted from a computer to a printer in bursts will now be described. Since the control procedure between the main unit and the terminal basically is the same as the processing for communication between extensions already described, the description will focus mainly upon the portions of the control procedure that differ.

First, when a printing application program is started up in the computer, a wireless adapter driver (not shown) incorporated in the data terminal operates to send a data transmission request and a transmission destination number (the extension number of the printer) to the wireless adapter 4 (see FIG. 2) via the communication interface.

Next, the wireless adapter effects a transition to a procedure for originating a call between extensions. Specifically, the wireless adapter sends an extension outgoing-call request to the side of the main unit using the logical control channel (LCCH-R). However, unlike the communication between extensions described above, it is necessary to use the frame (BDF) for burst data. Accordingly, information requesting allocation of the BDF is placed in the extension outgoing-call request event information.

Upon receiving the extension outgoing-call request event information, the main unit uses the logical control channel (LCCH-T) to given notification of the incoming call to the wireless adapter connected to the printer, which is the destination of the data transmission. Upon receiving incoming-call enable from the printer side, the main unit allocates the hopping pattern of the BDF used to the computer, which is on the transmitting side, and to the printer, which is on the call terminating-side. After the hopping pattern has been allocated, the computer and printer start data communication without the intermediary of the main unit.

Since the BDF is for performing burst transmission, ordinarily a data transmission is performed in one direction. At the start of communication, however, the computer and printer perform transmission on a frame-by-frame basis in regular order. During this time how many frames of data should be transmitted from the computer consecutively is decided as well as how many frames of data should be transmitted from the printer. Following this procedure makes it possible to realize channel use that is optimized in conformity with the application used by the terminal.

When this procedure is finished, the wireless adapter applies error correction processing to the print data received from the computer, assembles a frame and transmits the data to the printer. Using the BDF makes it possible to transmit at a rate of 450 kbps. It is possible to perform not only transmission of data from a computer to a printer but also transmission of data between computers through a procedure similar to that described above.

<Processing for Personal Computer Communication Access from Computer to Public Switched Telephone>

In this system, it is possible to perform not only high-speed data transmission within the system but also data transmission to public switched telephone network. For example, it is possible to accommodate applications such as applications for personal computer communication. Here also the basic procedure of operation is the same as that used when an outgoing call is placed on an outside line from a wireless telephone. Accordingly, the description will focus primarily on the portions of the procedure that differ.

When an application program for personal computer communication is started up in the computer, the wireless adapter driver incorporated in the data terminal operates to send an outside-line origination request to the wireless adapter 4 via the communication interface. As a result, the wireless adapter effects a transition to a procedure for originating a call on an outside line. Specifically, the wireless adapter sends an outside-line origination request to the side of the main unit using the logical control channel (LCCH-R) and receives the allocation of the idle slot of the PCF. After the slot allocation is received, data are transmitted using a slot in the PCH having a transmission rate of 32 kbps.

In order to transfer data to an analog public switched telephone line, it is required that the data be modulated by a modem. When data are transmitted to an outside line (of analog type), the data are modulated by a modem within the wireless adapter 4 and are placed in a state in which transmission is possible in the voice frequency band (300 Hz~3.4 KHz). Since the data modulated by such a modem can be handled as audio information, this information is ADPCM-coded and assembled into frames.

By following this procedure, it is possible to accommodate applications such as a personal computer communication application using a procedure the same as that used for voice communication.

In accordance with this embodiment, as described above, it is possible to realize flexible outside-line calls and calls between extensions conforming to the communication request and status of communication. The present invention is not limited to the foregoing embodiment and can be modified in various ways within the scope of the claims.

<Modification 1>

An example in which the main unit selects communication means based upon the number of wireless terminals performing extension communication will be described as a modification of the foregoing embodiment.

Figure 30:
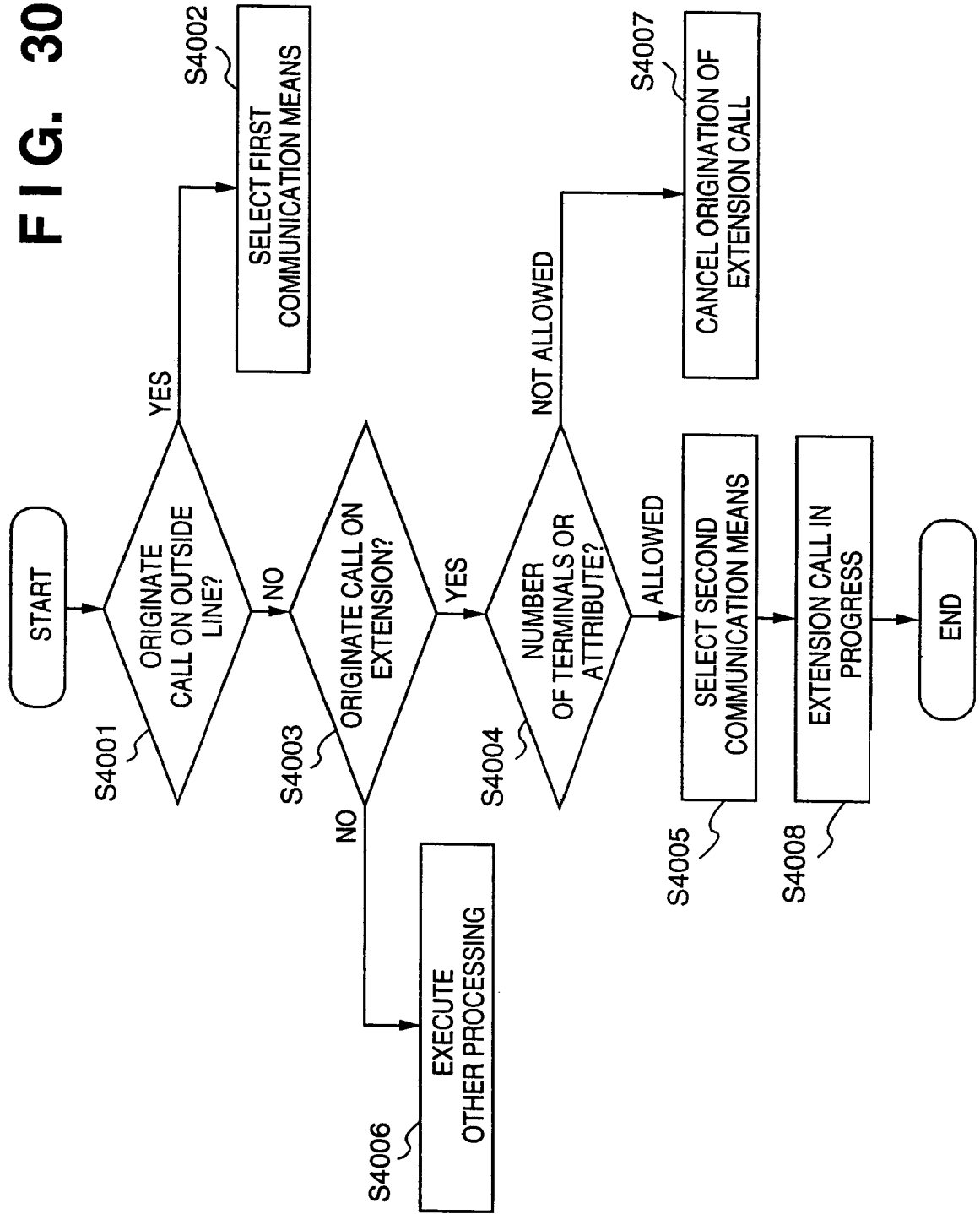
FIG. 30 is a flowchart illustrating an operation for selecting communication means in response to a communication request in a modification of the first embodiment.

FIG. 30 is a flowchart illustrating an operation performed by the main unit of this modification for selecting communication means in response to a communication request in a modification of the first embodiment.

First, upon receiving a communication request, the main unit 1 performs analysis to determine whether this is a command requesting origination of a call on an outside line or a command requesting origination of a call between extensions. If the request is for originating a call on an outside line ("YES" at step S4001 in FIG. 30), the main unit 1 selects first communication means (step S4002) for performing communication between the main unit 1 and a wireless terminal and, as described above, uses the voice channel of the PCF frame to place a call on the outside line. The detailed procedure is the same as that of processing executed when a call is originated on an outside line from the wireless telephone.

If the request is for originating a call between extensions ("YES" at step S4003), data are read out of the RAM 203 storing the number of wireless terminals performing extension communication and predetermined comparison processing is executed. Conditions used in the comparison include the number of hopping patterns that can be used in the system, the number of extension calls deduced from traffic conditions, etc.

The hopping patterns that can be used in the system of this modification are 20, as mentioned above. With regard to the frequency hopping patterns, use is made of 26 frequency channels having a width of 1 MHz, utilizing a frequency band of 26 MHz. If consideration is given to cases in which there are frequencies that cannot be used because of interference noise, 20 frequency channels are selected from the 26 channels and frequency hopping is carried out over the selected frequency channels in a predetermined order. This is as described earlier.

However, when interference is greater than expected and 20 hopping patterns cannot be acquired, it is so arranged as to perform control in such a manner that calls on outside lines are given priority and the number of extension calls is reduced. Consequently, there are also cases in which a request for origination of a call between extensions is not allowed ("NOT ALLOWED" at step S4004). At such time, origination of the call between extensions is canceled (step S4007). In a case where origination of a call between extensions is allowed, second communication means through which wireless terminals may communicate with each other directly is selected (step S4005) and extension call-in-progress is established (step S4008).

<Modification 2>

An example in which the attribute of a wireless terminal is adopted as a condition for allowing selection of the second means will be described as a second modification.

Upon receiving a communication request, the main unit 1 performs analysis to determine whether this is a command requesting origination of a call on an outside line or a command requesting origination of a call between extensions. If the request is for originating a call on an outside line ("YES" at step S4001 in FIG. 30), the main unit 1 selects first communication means (step S4002). Here also a call is placed on the outside line using the voice channel of the PCF frame. This operation is similar to that of the first modification described above.

Further, if the request is for originating a call between extensions ("YES" at step S4003), data are read out of the RAM 203, which stores the attributes of wireless terminals requesting extension communication, and the attributes are compared. One example of an attribute used in the comparison is an attribute as to whether a wireless terminal allows or inhibits the origination of a call on an extension.

In an ordinary exchange system, an extension call relies upon a non-blocking method and, hence, connection is always assured. However, in a case where common resources (frequency hopping patterns) are shared by outside lines and extensions, ranking conforming to status is required. Accordingly, in this modification, whether origination of call on an extension is enabled/disabled is decided beforehand for each individual wireless terminal and this is adopted as a criterion for making a judgment on the basis of a certain condition. For example, origination of a call on an extension is inhibited when the number of hopping patterns has become too small, thereby maintaining non-blocking of a call originated on an outside line.

More specifically, there is a case where origination of an extension call is canceled (step S4007 in FIG. 30), and a case where origination of an extension call is allowed and the second communication means selected (step S4005). If origination of a call on an extension is allowed, extension call-in-progress is established at step S4008.

Thus, in the first and second modifications, the main unit analyses the communication request of a wireless terminal. When an extension call is originated, communication becomes possible without the intermediary of the channel within the main unit and without the intervention of a connecting device. As a result, a large number of wireless telephones can be accommodated using a smaller number of connecting devices.

<Modification 3>

The status of a wireless terminal communicating with an extension is stored by the main unit 1. In a case where there is a communication request sent to this communicating wireless terminal, the operations described below may be performed.

The first operation is a case where no switching control is performed. In this case, the communication request is ignored and the main unit 1 sends a refusal notification to the outside line or extension that made the request. For example, in a case where the wireless terminal is performing a high-speed data transmission using its capacity to the full, having this terminal handle a further processing request might cause its processing performance to decline and make it impossible to maintain high-speed communication. In such case, having the main unit 1 not perform switching processing is an effective measure.

The second operation is a case where switching control is performed. In this case, the communication request is transmitted up to the wireless terminal. For example, when the wireless terminal is performing voice communication, there is still processing capacity left. Accordingly, switching processing is executed and the communication request may be communicated to the wireless terminal without problem.

<Modification 4>

If the wireless telephone 103-A senses the on-hook state when an extension call at a wireless terminal ends, as illustrated in the sequence diagram of FIG. 26, in processing for a call between extensions according to the foregoing embodiment, the wireless telephone 103-A transmits the on-hook signal to the wireless telephone 103-B and the wireless telephone 103-B, upon receiving the on-hook signal, transmits the on-hook acknowledge signal by way of the control information in the communication channel. Upon receiving the on-hook acknowledge signal, the wireless telephone 103-A changes over the communication channel to the logical control channel and transmits the extension communication end signal to the connection device 2.

In the fourth modification, control is not limited to that described above. Here an arrangement is adopted in which the wireless terminal seeks permission from the main unit 1 before the wireless terminals ends communication. More specifically, when the wireless telephone 103-A seeks permission from the main unit prior to the end of communication, the wireless telephone 103-A first sends the main unit 1 an extension communication-end enable signal. The main unit 1 then permits communication to end.

However, in a case where the wireless telephone 103-B was performing a holding operation before transmission of the extension communication-end enable signal, the request of the wireless telephone 103-A is not allowed. Thus, by not allowing end of communication depending upon the types of switching services and their combination, the system is provided with greater flexibility.

[Second Embodiment]

A second embodiment of the invention will now be described. Since the architecture of the wireless communication system according to this embodiment and the construction of the terminals, etc. constituting the system are similar to those of the system according to the first embodiment described above, these need not be illustrated or described again.

Here will be described processing for terminating a call on an outside line at the time of communication between extensions.

In the first embodiment, outside-line processing is performed separately of extension processing in regard to processing executed when an incoming call to a wireless telephone is terminated and processing executed when there is a call between extensions. However, in a case where a call is terminated on an outside line during an extension call, an incoming-call display is presented on the display unit 413 of the wireless telephone 3. To accomplish this, third communication means is provided in this embodiment.

The processing according to this embodiment will be described in accordance with the frame (PCF) for communication between the main unit and wireless telephones (FIG. 8), the overall architecture of the frame (PPF) for communication between wireless telephones (FIG. 9), the frame architecture of Tn and Rn (FIG. 12), the sequence diagram for describing termination of an incoming call on an outside line (FIG. 23) and the sequence diagram for describing termination of an incoming call on an extension (FIG. 26).

When the wireless telephone 103-A and wireless telephone 103-B are in direct extension-to-extension communication (see sequence 3019 in FIG. 26), the voice data and control data send and received to and from these wireless telephones are transmitted as shown in FIG. 12. Specifically, the control data are transmitted in D time slot and the voice data in the B time slot in Tn and Rn of the PPF shown in FIG. 9. On the other hand, the control data between the main unit 1 and the wireless telephones 103 are sent and received by way of LCCH-T and LCCH-R. By adopting this arrangement, frequency switching is performed in such a manner that the wireless telephone 103 is synchronized to the hopping frequency (F1) between the main unit and the wireless telephone in the first half of one hopping period (5 ms) and to the hopping frequency (F5) of direct extension-to-extension communication between the wireless telephones 103 in the latter half of the hopping period.

When an incoming call to an outside line is sensed by the main unit 1, the latter, using the LCCH-T of the PCF shown in FIG. 8, transmits an outside-line termination signal (2075) to the wireless telephone 103 accommodating the terminating outside line. At this time the PCF is changing over the frequency by the hopping patterns between the main unit and wireless telephone. Since the wireless telephone 103 is synchronized to the hopping frequency (F1) between the main unit and the wireless telephone in the first half of the PPF, the outside-line termination signal can be received from the LCCH-T.

Next, the wireless telephone 103 causes the outside-line LED on the display unit 413 to flash to thereby notify the user of the incoming call to the outside line. Further, in a case where control data are transmitted from the wireless telephone 103 to the main unit, the LCCH-R is used. Sending and receiving is performed through a method similar to that described above also with regard to control data other than that for outside-line termination.

In accordance with this embodiment as described above, when means for performing communication between the main unit and a wireless terminal is adopted as first communication means and means for performing direct communication between wireless terminals is adopted as second communication means, third communication means is provided for sending and receiving control information to and from the main unit and the wireless terminal even when the wireless terminals are directly communicating with each other. As a result, control information can be sent to the main unit even if an extension call has begun between the wireless terminals.

Further, two types of hopping patterns are used, one for a case where the wireless terminals are directly communicating with each other and one for a case where the main unit and a wireless terminal are communicating. As a result, the communication of control information is performed with ease even when the wireless terminals are directly communicating with each other.

In the second embodiment, the third communication means changes over the frequency in sync with the frequency hopping pattern of the first communication means. However, an arrangement may be adopted in which the third communication means has its own frequency hopping pattern and the main unit sends and receives control data in sync with the frequency hopping pattern of the third communication means. In other words, the wireless telephone 103 changes over the interval F1 of FIG. 9 to the hopping frequency of the third communication means to send and receive control data to and from the main unit 1.

By adopting this arrangement, the third communication means is capable of sending control information to the main unit, even if extension-to-extension communication between wireless terminals has begun, without being influenced by the frequency hopping pattern of the first communication means.

Alternatively, an arrangement may be adopted in which the third communication means performs communication only at a specific frequency and the main unit sends and receives the control data at the specific frequency of the third communication means. In other words, the wireless telephone 103 changes over the interval F1 in FIG. 9 to the specific frequency of the third communication means to send and receive the control data to and from the main unit 1. As a result, it is unnecessary to follow up the hopping pattern and the frequency switching mechanism is simplified.

Further, when the wireless telephone 103 is not synchronized to the hopping frequency (F1) between the main unit 1 and the wireless telephone 103 in the first half of the PPF and the amount of control data from the main unit is particularly large, the entirety of one hopping period (5 ms) may be allocated to LCCH. In such case the main unit 1 notifies the wireless telephone 103 of the fact that the mode is a communication mode for a large amount of control data before communication with the wireless telephone 103 is started.

[Third Embodiment]

In the first and second embodiments, a low-speed frequency hopping method is used. However, effects similar to those of these embodiments can be expected even if the direct sequence method is used. This can be realized by using the direct sequence method in the connecting device 2 of the main unit, the wireless telephone 3 and the wireless portion of the wireless adapter 4 of the system illustrated in FIG. 2.

Figure 31:
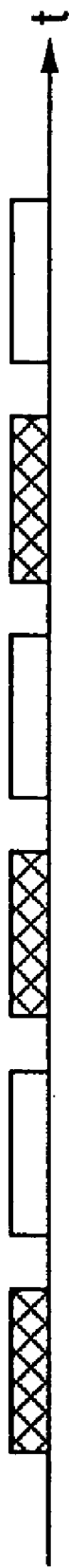
FIG. 31 is a diagram for describing a direct-sequence communication protocol.
Figure 34:
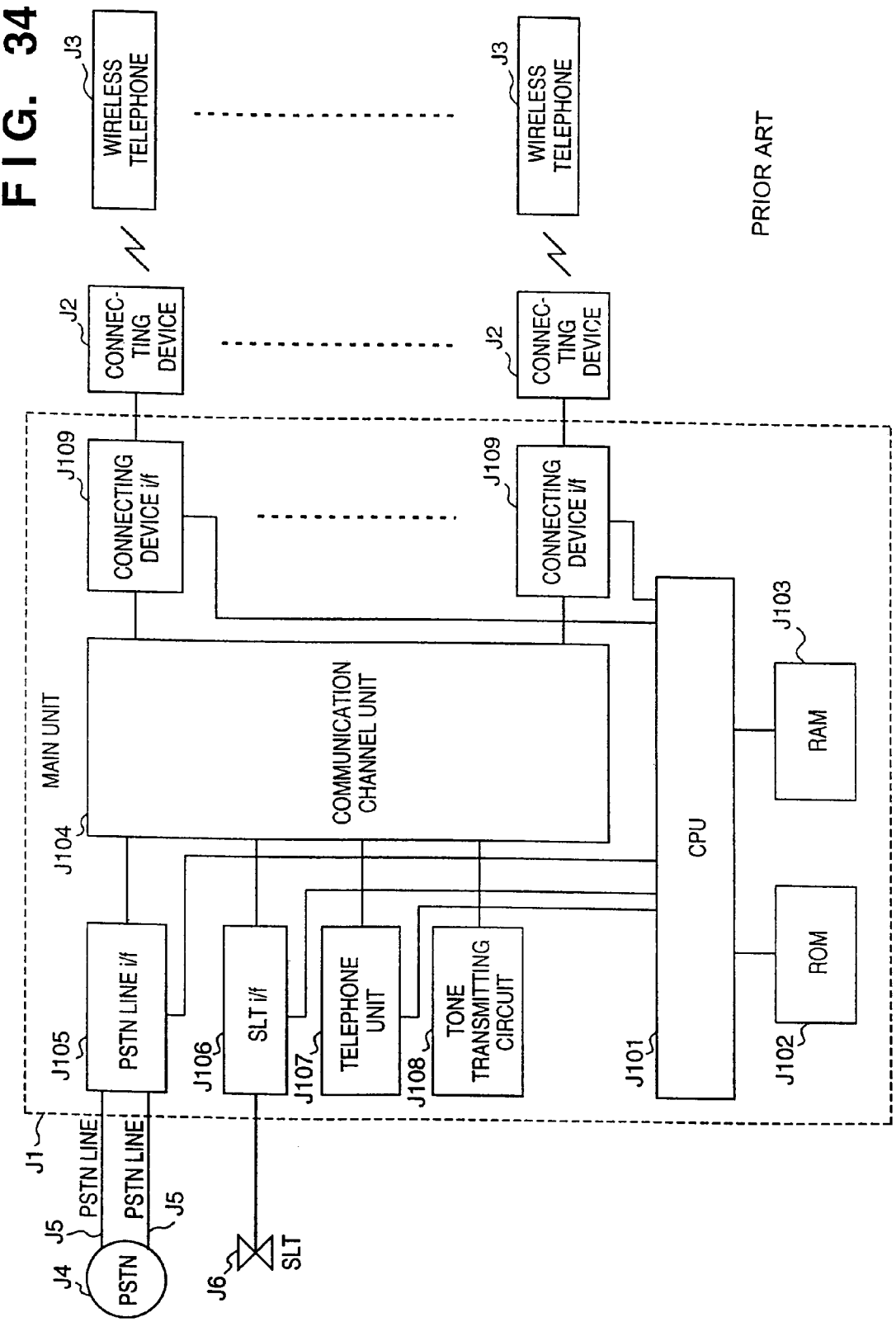
FIG. 34 is a block diagram showing the configuration of a wireless communication system and the construction of the main unit thereof according to the prior art.
Figure 35:
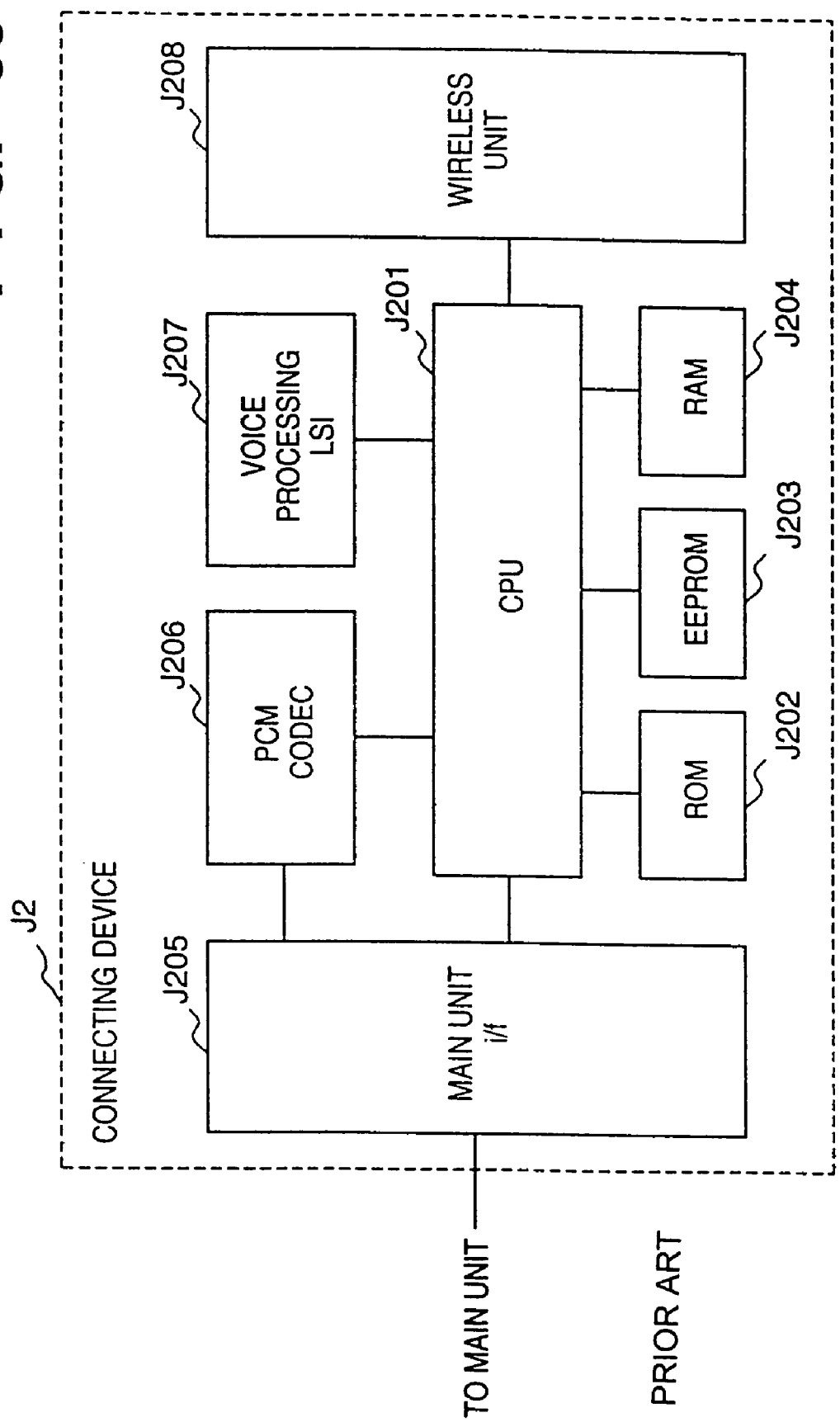
FIG. 35 is a block diagram showing the construction of a connecting device in the wireless communication system of the prior art.
Figure 36:
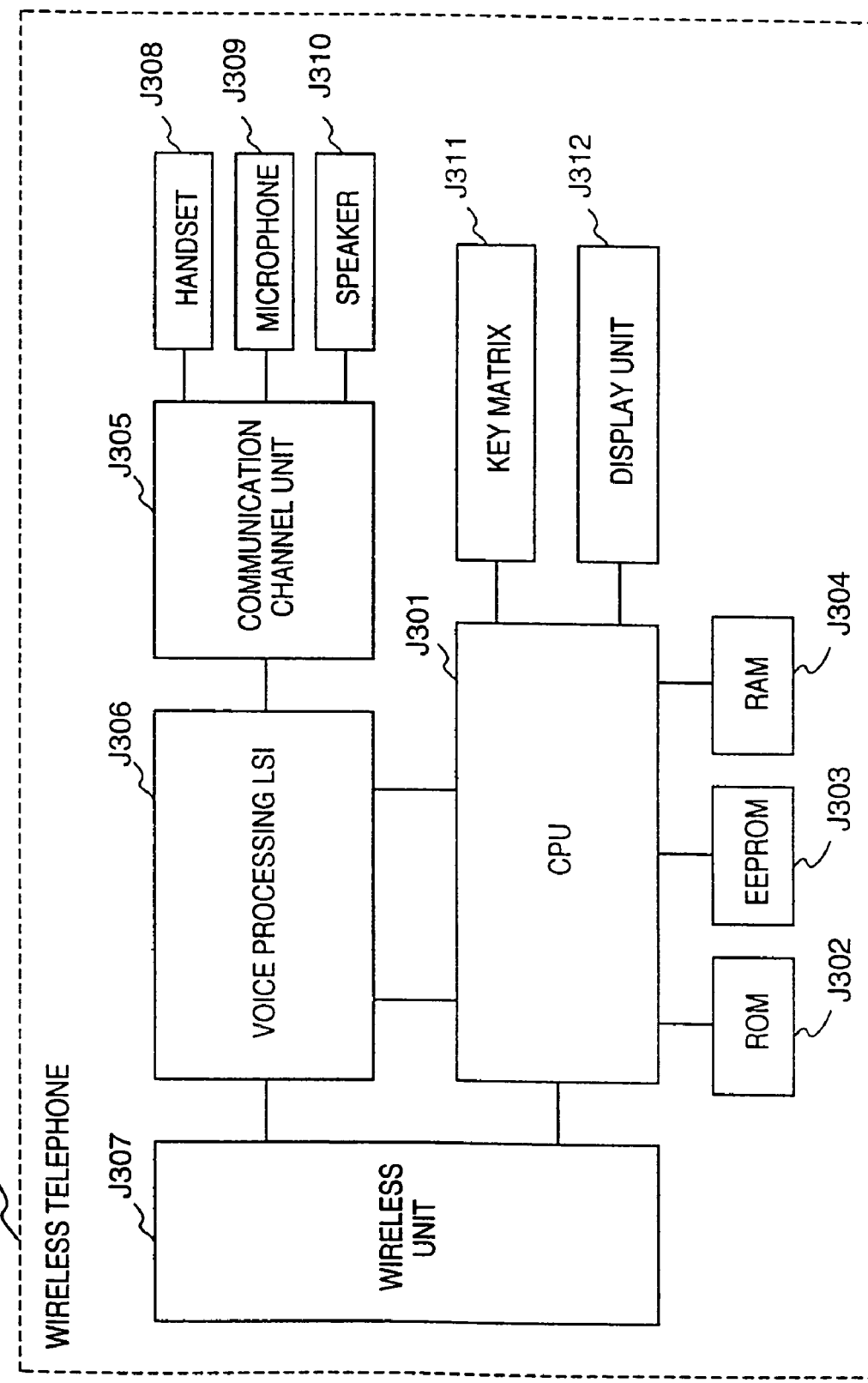
FIG. 36 is a block diagram showing the construction of a wireless telephone accommodated in the wireless communication system according to the prior art.
Figure 37:
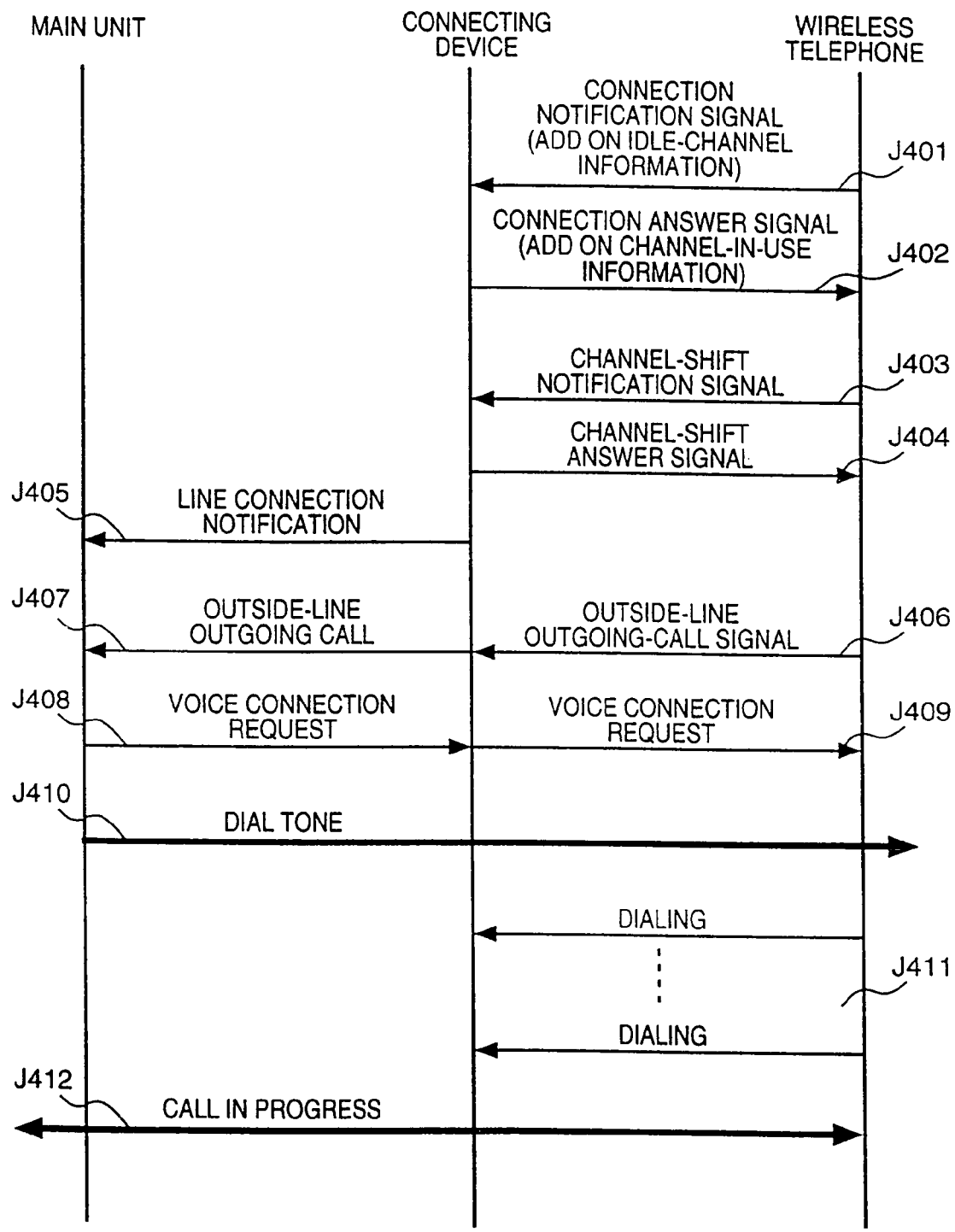
FIG. 37 illustrates the operating sequence of the wireless communication system according to the prior art.

FIG. 31 shows an example of a communication procedure for a case in which the direct sequence method is used. First, communication is divided between a main-unit transmission frame and a slave transmission frame along the time axis. In other words, the main-unit transmission frame and the slave transmission frame are sent in alternating fashion.

FIG. 32 is a diagram showing an example of the frame transmitted by the main unit. This frame has control information and time slots for each of the wireless terminals. In FIG. 32, FSYN represents a synchronizing signal and Ck (k=1, 2, ..., n) represents control information from the main unit to each wireless terminal k. Further, Tk denotes transmission data and GT represents guard time.

FIG. 33 is a diagram showing an example of a frame transmitted by the slave. Each wireless terminal transmits control information and data in the allocated time slots of the slave-transmission frame. As shown in FIG. 33, the frame includes a synchronizing signal FSYN, guard times GT, control information Ck from the wireless terminal to the main unit and transmission data Tk.

Attached to each item of transmission data is a control signal which precedes it. The receiving apparatus analyzes the control information and determines which connecting device or which wireless terminal the transmission data are destined for, thereby establishing communication. Though extension communication or outside-line communication is performed by the wireless line switching system, control for establishing the communication channel is carried out by the main unit and the main unit manages the status of each wireless terminal as well as overall communication.

Thus, by using the direct sequence method, the channel transmission rate can be increased. As a result, the number of slots multiplexed in a frame can be increased. Further, in a case where the FH method is employed, it is possible to realize a wireless communication system exhibiting excellent security and resistance to noise.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the present invention as described, the system is provided with a main unit, communication means for sending and receiving voice information and control information to and from the main unit and a plurality of wirelessly communicating wireless terminals, and communication means for communicating voice information or control information among the plurality of wireless terminals directly, wherein the communication means is selected and used depending upon a communication request and communication status, thereby making possible versatile outside-line communication and extension-to-extension communication.

Further, in accordance with the present invention, the system is provided with first communication means for performing communication between a main unit and a wireless terminal, second communication means for performing communication directly between wireless terminals, and third communication means for sending and receiving control information between the main unit and a wireless terminal while direct communication is being performed between the wireless terminals, thereby making it possible to send control information to the main unit even if extension-to-extension communication has started between the wireless terminals.

Further, in accordance with the present invention, it is possible for the main unit to implement centralized administration of the status of use of wireless terminals and the status of use of wireless channels.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication system having a plurality of wireless communication devices capable of communicating by a frequency hopped, a first wireless communication device comprising:
   data input means for inputting data;
   wireless communication unit for communicating the inputted data; and
   control unit for controlling said wireless communication unit,
   said control unit further comprising:
      first communication means for communicating with a second wireless communication device by a first frequency hopping pattern without relay of a third wireless communication device; and
      second communication means for communicating with the third wireless communication device by a second frequency hopping pattern while the first communication means communicates with the second wireless communication device;
   wherein the first frequency hopping pattern differs from the second frequency hopping pattern and is determined after the second wireless communication device responds to a paging from the first communication device.

2. A first wireless communication device comprising:
   data input means for inputting data;
   wireless communication unit for communicating the inputted data; and
   control unit for controlling said wireless communication unit,
   said control unit further comprising:
   first communication means for communicating with a second wireless communication device by a first frequency hopping pattern without relay of a third wireless communication device; and
   second communication means for communicating with the third wireless communication device by a second frequency hopping pattern while the first communication means communicates with the second wireless communication device;
   wherein the first frequency hopping pattern differs from the second frequency hopping pattern and is determined after the second wireless communication device responds to a paging from the first communication device.

3. The device according to claim 2, wherein information related to the second hopping pattern used by said second communication means is notified by the third communication device.

4. The device according to claim 2, wherein said second communication means communicates control information.

5. A method of communication performed in a first wireless communication device, the first wireless communication device including: data input means for inputting data; wireless communication unit for communicating the inputted data; and control unit for controlling said wireless communication unit, the method comprising:
   a first communication step of communicating with a second wireless communication device by a first frequency hopping pattern without relay of a third wireless communication device; and
   a second communication step of communicating with the third wireless communication device by a second frequency hopping pattern while the first communication means communicates with the second wireless communication device;

wherein the first frequency hopping pattern differs from the second frequency hopping pattern and is determined after the second wireless communication device responds to a paging from the first communication device.

6. The method according to claim 5, wherein information related to the second hopping pattern used by said second communication step is notified by the third wireless communication device.

7. The method according to claim 5, wherein control information is communicated in said second communication step.

8. A first wireless communication device, comprising:
   data input means for inputting data;
   wireless communication unit for communicating the inputted data; and
   control unit for controlling said wireless communication unit,
   said control unit further comprising:
      first communication means for communicating with a second wireless communication device by a first frequency hopping pattern without relay to a third wireless communication device, and
      second communication means for communicating with the third wireless communication device by a second frequency hopping pattern,
   wherein communication of said first communication means and communication of said second communication means employ time division switching and frequency hopping such that said second communication means can communicate with the third wireless communication device while said first communication means communicates with the second wireless communication device, and the first frequency hopping pattern differs from the second frequency hopping pattern and is determined after the second wireless communication device responds to a paging from the first communication device.

9. A method of communication performed in a first wireless communication device, the first wireless communication device including: data input means for inputting data; wireless communication unit for communicating the inputted data; and control unit for controlling said wireless communication unit, the method comprising:
   first communication step for communicating with a second wireless communication device by a first frequency hopping pattern without relay to the third wireless communication device, and
   second communication step for communicating with the third wireless communication device,
   wherein communication of said first communication step and communication of said second communication step employ time division switching and frequency hopping such that said second communication step can communicate with the third wireless communication device by a second frequency hopping pattern while said first communication step communicates with the second wireless communication device, and the first frequency hopping pattern differs from the second frequency hopping pattern and is determined after the second wireless communication device responds to a paging from the first communication device.

* * * * *